United States Patent
Ong et al.

(10) Patent No.: US 9,318,139 B2
(45) Date of Patent: Apr. 19, 2016

(54) RECORDING MEDIUM, A DATA STORAGE APPARATUS AND A METHOD OF PREPARING A RECORDING MEDIUM

(71) Applicant: Marvell International Ltd., Hamilton (BM)

(72) Inventors: Chun Lian Ong, Singapore (SG); Zhimin Yuan, Singapore (SG); Shiming Ang, Singapore (SG); Budi Santoso, Singapore (SG); Jingliang Zhang, Singapore (SG); Siang Huei Leong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/416,554

(22) PCT Filed: Jul. 25, 2013

(86) PCT No.: PCT/SG2013/000309
§ 371 (c)(1),
(2) Date: Jan. 22, 2015

(87) PCT Pub. No.: WO2014/017984
PCT Pub. Date: Jan. 30, 2014

(65) Prior Publication Data
US 2015/0179198 A1   Jun. 25, 2015

Related U.S. Application Data

(60) Provisional application No. 61/675,379, filed on Jul. 25, 2012.

(51) Int. Cl.
*G11B 5/596*    (2006.01)
*G11B 5/82*     (2006.01)
*G11B 5/00*     (2006.01)

(52) U.S. Cl.
CPC .......... *G11B 5/59633* (2013.01); *G11B 5/596* (2013.01); *G11B 5/59638* (2013.01); *G11B 5/59688* (2013.01); *G11B 5/82* (2013.01); *G11B 2005/0002* (2013.01)

(58) Field of Classification Search
None
See application file for complete search history.

(56) References Cited

U.S. PATENT DOCUMENTS

| | | | | |
|---|---|---|---|---|
| 5,898,534 A * | 4/1999 | Gray | ........................... | 360/77.01 |
| 6,249,396 B1 | 6/2001 | Gray | | |
| 6,873,482 B1 * | 3/2005 | Hsieh et al. | ..................... | 360/48 |
| 7,123,434 B2 * | 10/2006 | Roth | .............................. | 360/48 |
| 7,706,093 B2 * | 4/2010 | Aoyama | ........................ | 360/57 |

OTHER PUBLICATIONS

International Search Report for PCT/SG2013/000309, mailed Oct. 10, 2013; ISA/AU.

* cited by examiner

*Primary Examiner* — Wayne Young
*Assistant Examiner* — James L Habermehl

(57) ABSTRACT

In the present disclosure, a recording medium and a method of preparing a recording medium is provided. In a recording medium, a first annular servo track can be provided on a first layer of the recording medium, and second annular servo track can be provided on the first layer of the recording medium. The second annular servo track can be adjacent to the first annular servo track. In the recording medium, the first annular servo track and the second annular servo track are magnetically polarized and are magnetically opposing in polarity. A corresponding method of preparing a recording medium is provided.

19 Claims, 19 Drawing Sheets

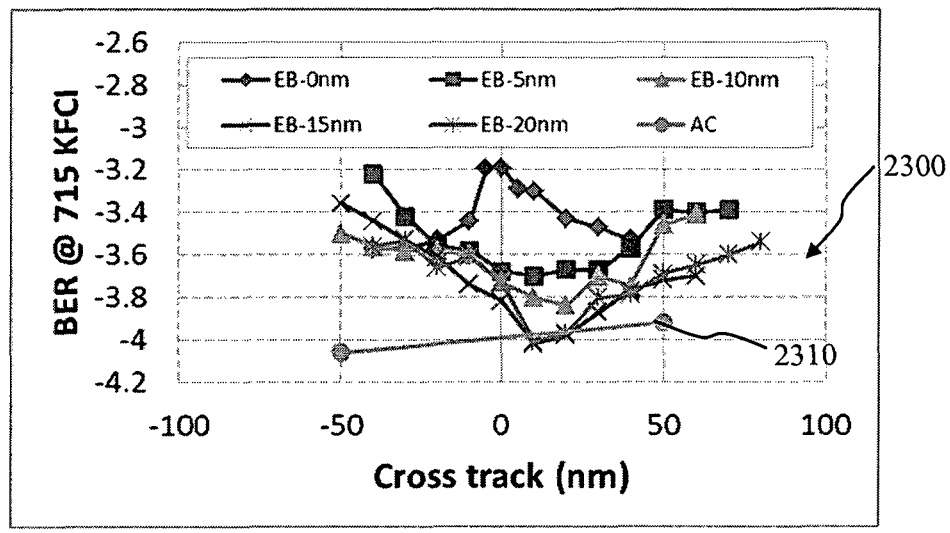
FIG. 23
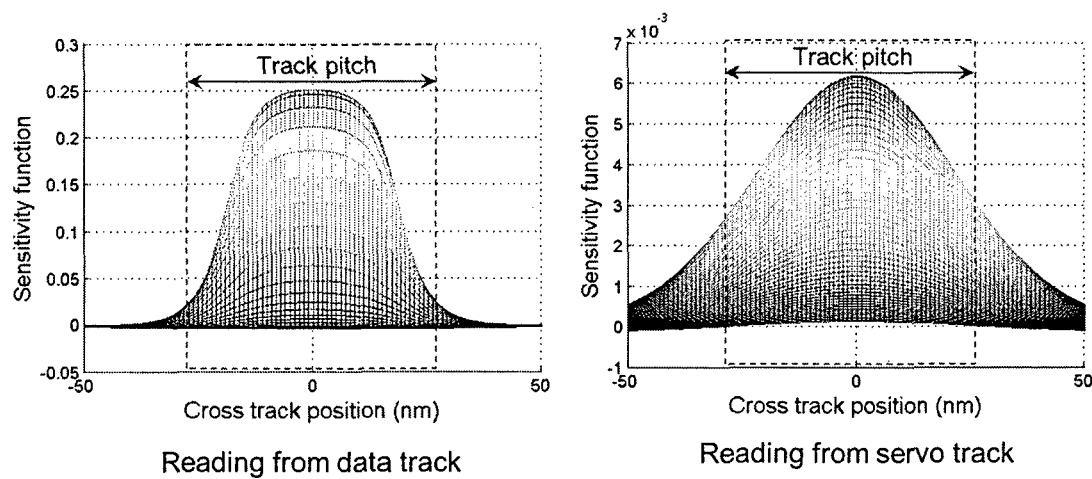
Reading from data track
FIG. 24A
Reading from servo track
FIG. 24B

RECORDING MEDIUM, A DATA STORAGE APPARATUS AND A METHOD OF PREPARING A RECORDING MEDIUM

RELATED APPLICATIONS

This application is a National Stage of International Application No. PCT/SG2013/000309, filed on 25 Jul. 2013, which claims the benefit of U.S. Provisional Application No. 61/675,379, filed on 25 Jul. 2012. The disclosures of the above priority applications are hereby incorporated by reference in their entirety.

TECHNICAL FIELD

The present disclosure describes embodiments generally related to a recording medium and a method of preparing a recording medium. Further, a data storage apparatus is provided.

BACKGROUND

A hard disk drive (HDD) is a data storage device used for storing and retrieving digital information using rapidly rotating discs coated with magnetic material. A typical HDD includes one or more rigid rapidly rotating disks with magnetic heads arranged on a moving actuator arm to read and write data onto the disk surfaces. The disks are placed about a spindle, and are spun rapidly about the spindle as information is written to and read from the disk surface as it rotates past magnetic read-and-write head or heads that operate closely over the magnetic surface. The read-and-write head is used to detect and modify the magnetization of the material under it.

In order to accurately control the read-and-write (or read/write) head, a servo system is provided for control of the HDD, which can be for generating position feedback signals. HDD servo systems typically involve three kinds of control tasks: track-seeking control, track-following control, and setting control. In track-seeking control, the head positioning servomechanism moves the read/write head as fast as possible from one track to another. Once the head reaches the target track, it is regulated over the track so that the head can follow the track as precisely as possible during the operation of reading or writing data, in track-following control. In settling control, the servo provides for smooth settling, i.e. transition between the track-seeking and track-following modes without any impact.

In a conventional dedicated servo system, servo information is provided on a layer distinct from the data recording layer. Typically, the servo layer is provided on a separate layer from a disk including a data recording layer. In an embedded servo system, servo information is interspersed with data across the entire surface of all of the hard disk platter surfaces. The servo information and data are read by the same read/write heads, where the heads do not need to wait for the disk to rotate the servo information into place.

Recent developments have also introduced a buried dedicated servo system where servo information is provided on a layer distinct from the data recording later. Additionally, a servo recording layer is provided as a layer secondary to the data recording layer, and where both servo layer and data recording layer are provided on a single disk. During data layer recording, the effective writing field from the data head is lower than the nucleation field of the servo layer. Therefore, the recorded servo information on servo layer will not be erased despite multiple times of writing on the data recording layer.

Although such a buried dedicated servo system supports high track density in the development of present day HDD technology, a concern is raised where servo signal interference causes a degradation of data signal integrity during operation.

SUMMARY

According to an embodiment, there is provided a recording medium including a first annular servo track provided on a first layer of the recording medium; and a second annular servo track provided on the first layer of the recording medium and adjacent to the first annular servo track; wherein the first annular servo track and the second annular servo track are magnetically opposing in polarity.

According to an embodiment, there is provided method of preparing a recording medium including: writing a first annular servo track on a first layer of the recording medium, the first annular servo track having a magnetic polarization of a first direction; and writing a second annular servo track on the first layer of the recording medium, the second annular servo track having a magnetic polarization in a second opposite direction, the second track adjacent to the first track.

According to an embodiment, there is provided a method of determining a signal for a sensor head interacting with a recording medium including a data track provided on a data layer corresponding to a first servo track and a second servo track provided on a servo layer, the first servo track and the second servo track magnetically opposite in polarity, the method including: carrying out any one of a read function and a write function with the sensor head on the data track; measuring a voltage in the sensor head while carrying out the any one of a read function and a write function; and determining a position error signal of the sensor head based on a change in the voltage measurement. Reader resistance can be measured through voltage or current measurement.

According to an embodiment, there is provided a data storage apparatus including: a recording medium including: a data track provided on a data layer corresponding to a first servo track and a second servo track provided on a servo layer, the first servo track and the second servo track magnetically opposite in polarity; a sensor head configured to carry out any one of a read function and a write function on the data track; a measurement circuit configured to measure a voltage in the sensor head while carrying out the any one of a read function and a write function; and a position error determination circuit configured to determine a position error signal of the sensor head based on a change in the voltage measurement.

According to an embodiment, there is provided a recording medium including: a first annular servo track provided on a first layer of the recording medium; and a second annular servo track provided on the first layer of the recording medium and adjacent to the first annular servo track; wherein a bit randomization portion is provided in an annulus formed by an exterior perimeter of the first annular servo track and an interior perimeter of the second annular servo track.

According to an embodiment, there is provided a method of preparing a recording medium including: writing a first annular servo track on a first layer of the recording medium; and writing a second annular servo track on the first layer of the recording medium, the second annular servo track adjacent to the first annular servo track; wherein a bit randomization portion is provided within an angular sector of an annulus formed by the first annular servo track and the second annular servo track.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which:

FIG. 23 illustrates a BER measurement according to an embodiment.

FIG. 24A illustrates a reader sensitivity function for a data track read process.

FIG. 24B illustrates a reader sensitivity function for a servo track read process.

DETAILED DESCRIPTION

Figure 1A:
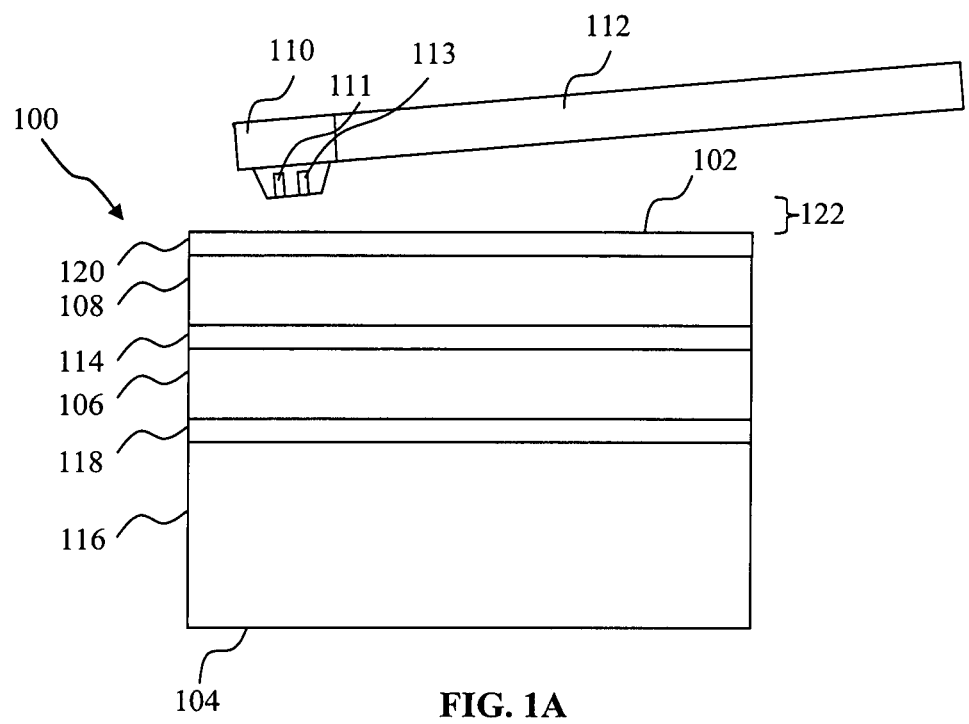
FIG. 1A illustrates a cross-sectional side view of a recording medium according to an embodiment.

Embodiments of a recording medium and a method of recording on the recording medium are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. The data storage apparatus may include a memory which is for example used in the processing carried out by the data storage apparatus. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to the present disclosure and may encompass a "circuit" as above, or may be understood to be any kind of a logic-implementing entity therefrom.

In an embodiment, a hard disk drive (HDD) is provided with a buried dedicated servo system, where servo information is provided on a layer distinct from a layer for recording data. Additionally, a servo recording layer is provided as a layer secondary to the data recording layer. Both the servo recording layer and the data recording layer are provided on a same or singular storage medium, and in the case of the present HDD application, a storage disk. In an embodiment, a plurality of disks or platters are provided in the hard disk drive, rotatably mounted about a spindle rotated by a spindle motor. Multiple read/write heads are provided, one for each disk, for carrying out a read function or a write function on the disk. In other embodiments, multiple heads are provided for carrying out a read function or a write function on a single disk.

In an embodiment, each disk in a plurality of disks mounted on a spindle is provided with a buried dedicated servo system. In other embodiments, only a single disk is provided with the buried dedicated servo system, while other disks mounted on the spindle are dedicated for data recording. In yet other embodiments, any number of disks are provided with the buried dedicated servo system, depending on the need for a constant access to positioning information. The buried dedicated servo can provide higher positioning accuracy through continuous or continual location determination, and in relieving servo information on servo sectors and tracks from the data recording layer, thereby also dedicates storage space in the recording layer for data recording. The dedicated servo system also increases the data recording density by increasing the track positioning accuracy.

According to an embodiment, during HDD operation, shingled writing may be employed to record small bits with overlap in the layout of data tracks. In shingled writing, the read/write head or recording head moves in a down-track direction along a particular track as data is written in blocks or shingles, and in successive scans move across the disk in a cross-track direction across adjacent tracks. Writing a shingle or shingles of data to the tracks of the disk is carried out by the magnetic flux of a recording lead. As shingles are written, writing on a current track may overwrite a portion of the previous track resulting in a narrower track pitch.

In an embodiment, a head-positioning servomechanism is provided in the HDD to act as part of a control system. The control system may position the head which is mounted on an actuator over a desired data track of a storage medium and reposition the read/write head from one data track to another.

According to an embodiment, in a HDD servo control system, the position error signal (PES), which relates to the position of the sensor head relative to a center of the desired data track, may be sensed and used by the servo system to generate appropriate commands to the actuator, which in turn moves the head in an effort to reduce the position error. PES is a signal proportional to the relative difference of the positions of the centre of the head and the nearest track centre. Therefore, the PES may provide an indication of the position of the head relative to the storage medium, for example the position of the head relative to a data track, and whether the head is positioned at the centre of the data track (on track) or shifted relative to the centre of the data track (off track) and the magnitude of the shift, such that the position of the head may then be adjusted.

FIG. 1A illustrates a cross-sectional side view of a recording medium according to an embodiment. In an embodiment, recording medium 100 is in the shape of a circular disk and is also referred to in the present disclosure as a disk. The disk 100 includes a first surface 102, also known as a top surface, and a second bottom surface 104 parallel to and oppositely facing from the first surface 102

In an embodiment, the recording medium 100 can be a magnetic medium. Within the recording medium 100 includes a first layer 106 and a second layer 108 which can be a magnetic layer, or particularly a ferromagnetic layer, and can be magnetically manipulated by way of a read/write head or a sensor head 110, which is coupled to an actuator arm 112 for operating the read/write head 110. In an embodiment, the read/write head is a sensor head, including a sensor for magnetically manipulating a magnetic layer in the recording medium. In an embodiment, the sensor head includes a sensor for reading and/or writing on the magnetic layer. In an embodiment, the sensor head is a sensor for reading and/or writing on the magnetic layer.

According to an embodiment, a magnetic recording medium including a first layer and a second layer is provided to store information. One of the layers is stacked on top of the other layer. In an embodiment, the second layer 108 is stacked on top of the first layer 106. The first layer 106 is arranged to receive a portion of servo information and can be known as a servo layer. The second layer 108 is arranged to receive a portion of user data and can be known as a data recording layer. In the present disclosure, references to "data" typically refer to "user data", unless otherwise made clear by the context. The second layer 108 can also be further configured to record addressing information of servo information.

In an embodiment, the servo layer 106 can be separated from the data recording layer 108 by a first intermediate layer 114. Further, a soft under layer (SUL) 116, including a soft magnetic material, and having a high permeability is provided. There are certain advantages of providing the SUL 116 in the recording medium—the SUL 116 causes the flux from the read/write head 110 to be substantially perpendicular to the media plane; the SUL 116 increases a readback signal amplitude; and the SUL 116 provides an easy, low reluctance path for returning the flux to the return read/write pole on the read/write head 110. A second intermediate layer 118 can also be provided in between the servo layer 106 and the SUL 116.

In an embodiment, an overcoat 120 is provided over the data recording layer 108. The overcoat 120 forms the top surface 102 of the recording medium 100. In an embodiment, the overcoat 120 is a diamond-like carbon (DLC) overcoat. Further, a lubricant film surface can be provided over the overcoat 120. In order to support high density read/write functions, the magnetic spacing 122 between the read/write head 110 and the data recording layer should be as small as possible.

In other embodiments, other layers may be introduced into the recording medium 100, or various described layers which may be deemed as non-essential may be removed. Further the layers of the recording medium may be provided in any order, not necessarily being limited by that as described in embodiments above or illustrated in the figures. In the present disclosure, focus will be paid on the servo layer and the data recording layer in interaction with the read/write head of the HDD.

Figure 1B:
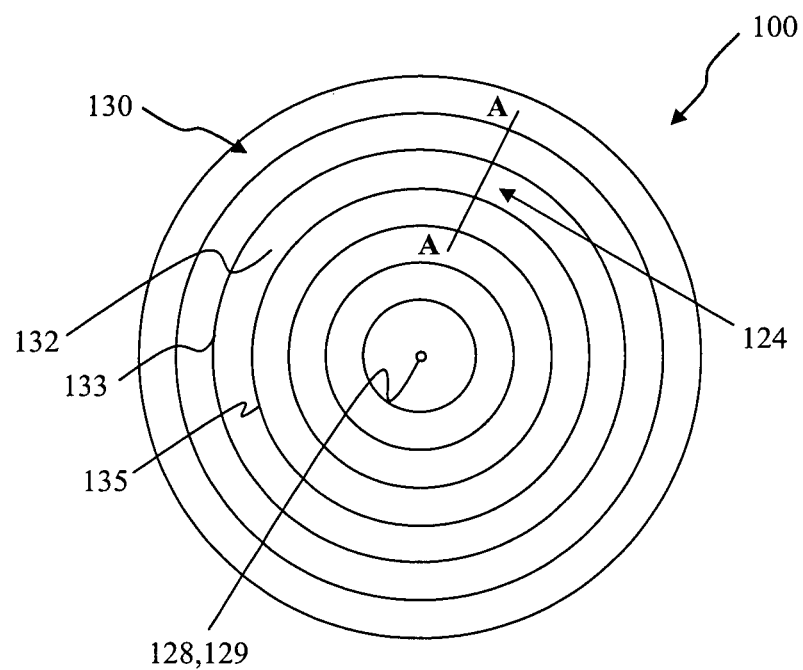
FIG. 1B illustrates a top-down schematic representation of the recording medium of FIG. 1A.

FIG. 1B illustrates a top-down schematic representation of the recording medium of FIG. 1A. Recording medium 100 includes a plurality of tracks. Particularly, a plurality of continuous annular tracks 130 are provided on recording medium 100, which run parallel to the circumference of the circular recording medium 100. Each annular track can be understood to have or be bounded by an interior perimeter, proximal or closer to the center of the disk, and an exterior perimeter, proximal or closer to the circumference of the disk. The plurality of annular tracks has a common center 128 at a central axis 129 of the disk, which runs perpendicularly through the disk, and forms a rotational axis of the disk. In operation, the recording medium is rotated about the central rotational axis 129.

From a top-down perspective, the tracks 130 observed are provided as part of the data recording layer 108. Tracks 130 can also be referred to as data tracks 130. Data track 132 is shown to have an exterior perimeter 133 and an interior perimeter 135. In an embodiment, similar continuous annular servo tracks are provided in the lower servo layer 106, which run parallel to each other and to the circumference of the circular recording medium 100. The plurality of servo tracks similarly have the same center 128 and rotate as part of the servo layer 106 about the same central rotational axis 129.

According to an embodiment, the servo layer 106 can be a buried layer arranged beneath the data recording layer 108. In the context of various embodiments, the servo layer 106 and the data recording layer 108 are separate layers or distinct layers where the signals from the servo layer 108 and the data layer 108 can be read together at the same time. The servo layer 106 has a perpendicular or a longitudinal magnetization orientation for providing magnetic information for determining the location of the read/write head 110 in relation to the storage medium 100. The servo information is provided on the servo layer 106 distinct from the data recording layer 108 so as to allow continuously available servo readback to enable continuous or continual position feedback, thereby providing continuous or continual location detection without utilizing any of the recording layer 108 for location detection.

Figure 1C:
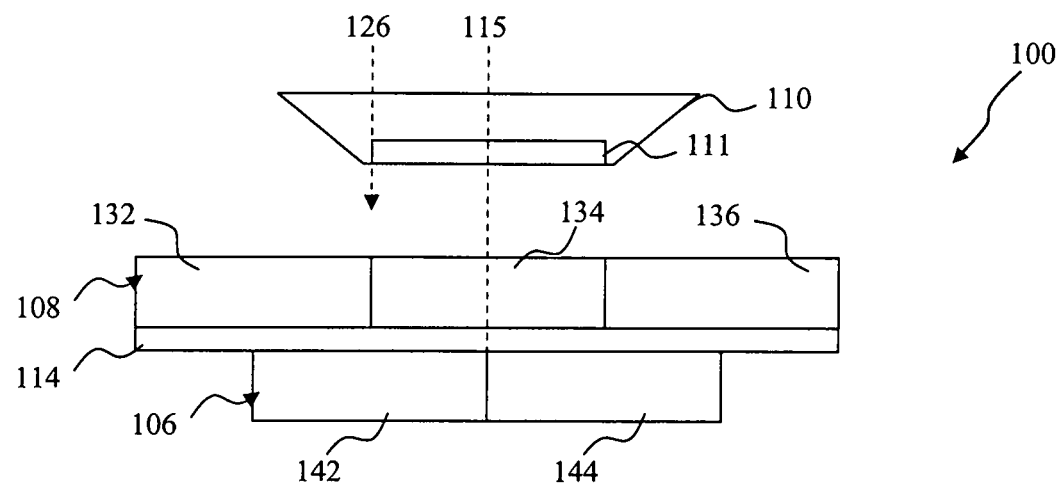
FIG. 1C illustrates a cross-sectional side view of a portion of the recording medium of FIG. 1B.

FIG. 1C illustrates a cross-sectional side view of a portion of the recording medium of FIG. 1B. FIG. 1C can correspond to a view across line A-A from a direction indicated by arrow 124 in FIG. 1B. A plurality of data tracks 132, 134, 136 are provided in data recording layer 108, configured to at least record data. Further, servo tracks 142 and 144 are provided in servo layer 106, configured to at least record servo bursts. In an embodiment, intermediate layer 114 is provided between the servo layer 106 and the data recording layer 108. Further, read/write head 110 is illustratively indicated in FIG. 1C.

Figure 1D:
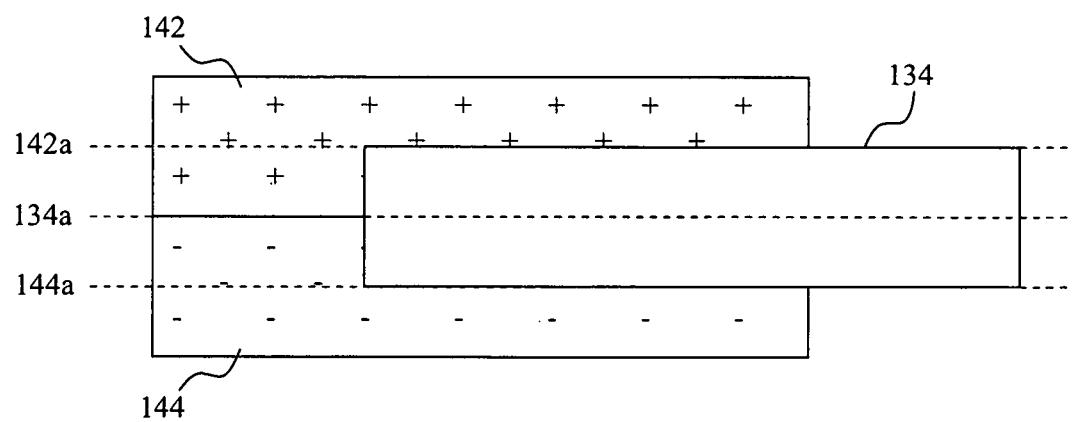
FIG. 1D illustrates a top-down view of a schematic of a data track and two servo tracks and according to various embodiments.

FIG. 1D illustrates a top-down view of a schematic of a data track 134 and two servo tracks 142 and 144 according to various embodiments. FIG. 1D can correspond to the view indicated by arrow 126 in FIG. 1C. Data track 134, as part of data recording layer 108, is provided over a first servo track 142 and a second servo track 144, as part of servo layer 106.

In an embodiment, first servo track 142 includes a track width or a track pitch. Correspondingly, second servo track 144 also includes a track width, which is substantially equal to the track width of first servo track 142. Further, in an embodiment, data track 134 includes a track width which is substantially equal to the track width of servo tracks 142 and 144. In fact, in various embodiments, the track width of each track in the recording medium 100, including each servo track and each data track, is substantially equal to one another. In various embodiments, the data tracks and the servo tracks are not equal or substantially equal in track widths.

In an embodiment, the data track 134 can be arranged from the first servo track 142 by half a track width. In other words, the data track 134 can be arranged from the first servo track 142 such that the projection of the data track 134 on a plane parallel to the top surface 102 of the recording medium can be half a track width from the projection of the first servo track 142 on such a same plane. Further, the data track 134 can also be arranged from the second servo track 142 by half a track width.

According to an embodiment, the data track 134 can be between the first servo track 142 and the second servo track 144. "Between" may mean that the projection of a center line 134a of the data track 134 on a plane parallel to the top surface 102 of the recording medium is between the projection of a center line 142a of the first servo track 142 on the plane and the projection of a center line 144a of the second servo track 144 on the plane. The center line of a track runs along the track.

In an embodiment, the data track 134 is provided corresponding to the first servo track 142 and the second servo track 144. By "corresponding", it is understood that the first servo track 142 and the second servo track 144 can store servo information relating to information being written on data track 134. It can also be understood that the first servo track 142 and the second servo track 144, or the magnetic properties of the written first servo track 142 and the second servo track 144, can be used to extract a signal for determining position of a read/write head in carrying out a read or write function on the data track 134. In various embodiments, the data track 134 is provided can be equidistant between the first servo track 142 and the second servo track 144 when the tracks are projected on a similar plane parallel to the top surface 102. In such a case, as each of the data track 134, the first servo track 142 and the second servo track 144 are of a track width size, the sides of the data track 142 intersect with the center lines 142a and 144a of the first servo track 142 and the second servo track 144, and the center line 134a of data track 134 intersects with where the first servo track 142 physically meets the second servo track 144. In other words, data track 134 can be arranged by half a track width from both the first servo track 142 and the second servo track 144. Additionally, the data track 134 can be arranged from the first servo track 142 such that a projection of the data track 134 on a plane parallel to the top surface 102 of the recording medium 100 (or the bottom surface 104 of the recording medium) can be half a track width from the projection of the data track 134 on such a plane.

In various embodiments, the recording medium 100, including the data tracks 130 of the data recording layer 108, may be divided into various data sectors with addressing information interspersed between the data sectors. The addressing information can include automatic gain control (AGC). Additionally, addressing information can include sector address mark (SAM). Addressing information can also include GrayCode. In various embodiments, within the addressing information, the AGC can occupy 80 bits, the SAM can occupy 12 bits and the GrayCode can occupy 24 bits. The addressing information can be considered servo information, and can be recorded on the data layer 108.

According to various embodiments, the automatic gain control (AGC) can also be used to establish a feedback clock signal for synchronization of media read and write operations to minimize the effect of spindle speed fluctuation. The AGC can also be used to normalize the amplitude of read-back signal for a gray code detector and SAM detector. The SAM can provide the down-track information which tells the number of servo sectors that read head has crossed. The GrayCode can indicate the servo track number (track address) that the read/write head 110 is following. All servo sectors on a servo track have the same servo track number encoded.

According to an embodiment, read/write head 110, supported by an actuator arm 112 or a flexure, is provided for reading and/or writing data onto a data recording layer 108, additionally, onto a portion or a segment of a data recording track 134 in the data recording layer 108. The read/write head 110 is of course able to read and/or write data on any portion or segment of any data recording track in the data recording layer 108. Further, the read/write head 110 is further able to read information on any portion or segment of a servo track in a servo layer 106 in the recording medium 100. In an embodiment, the read/write head 110 is configured to read and or write data on a continuous annular data recording track 134, the read/write head 110 tracking or tracing the data recording track 134 through one or a multiple of revolutions of the rotating recording medium 100, until a read or write task or function is completed by the read/write head 110 on the data recording track 134.

In an embodiment, the read/write head 110 is a magnetoresistive head with independent read and write elements. In an embodiment, an inductive element 111 is provided for write operations and a magnetoresistive element 113 is provided for read operations. Other read/write head configurations with various individual or combined heads are also possible, according to the present disclosure.

In carrying out the read or write task on the data recording track 134, the read/write head 110 is aligned to the data recording track 134. Additionally, a center line 115 of the read/write head 110 is aligned to the center line 134a of the data recording track 134 during a read or write task carried out by the read/write head 110.

Alignment of the center line 115 of the read/write head 110 to the center line 134a of the data recording is important, such as to obtain a maximum magnetic signal from the data recording track for the read or write task. Further, certain physical limitations as well as deviations give rise to position error or track misregistration (TMR). Certain factors contributing to TMR can be repeatable runout (RRO) and non-repeatable runout (RRO). In RRO, the error is "phase locked", that is, the head is off-track by the same amount at the same point on the disk, i.e. for each revolution. Factors contributing to RRO can include, but are not limited to, disk eccentricity, where data recording tracks and servo tracks are not perfectly geometrically annular, and perhaps errors in servo track writings. Factors contributing to NRRO can include, but are not limited to, bearing defects, noise, spindle motor imperfections, platter vibrations, air fluctuations, and servo loop response errors.

In view of TMR, it is necessary for the read/write head 110 to constantly laterally adjust, i.e. move left and right, in order to stay in the middle of the track or be aligned to the central line 134a of the data recording track 134 during a read or write task carried out by the read/write head 110. To facilitate such adjustment, a control system of the hard disk drive generates a position error signal (PES) which identifies how far off-track or misaligned the read/write head is at a specific point of time.

PES is a signal proportional to the relative difference of the positions of the center of the read/write head and the nearest track center. The position error signal contains two sources of motion: motion of the actuator and; motion of the disk surface itself. The pattern used on the servo surface is designed in concert with a demodulation scheme, such that when read back, the signals infer head position relative to the nearest track center.

Generally, the PES is generated with regard to the servo system, derived from servo bursts in the operation of the disk drive. A common method of generating a PES occurs in a system where a servo burst pattern is of a first frequency (f1) and the subsequent servo burst pattern is of a second frequency (f2). The servo burst patterns provide dual frequency signals to a read head. A PES is generated from finding a difference in signal amplitude between f1 and f2, as part of a demodulation of readback signals. When a read head is positioned over the entire width of a data recording track, the PES may be at a minimum. The read head is ideally positioned over a center line of the data recording track during reading for good track following. However, in such a frequency-based dual track servo scheme, it is still a challenge to fully decouple a data signal and a servo signal as sent and received by the read/write head. Further, in the current art, generation of PES seems to be limited to obtaining and demodulating readback servo signals.

According to an embodiment of the present disclosure, the first servo track 142 and the second servo track 144 are provided as magnetically opposed in polarity. Additionally, first servo track 142 is provided as magnetically positive in polarity and second servo track 144 is provided as magnetically negative in polarity. In other words, the present disclosure describes the use of two different polarity DC tracks to realize the continuous servo in the dedicated servo application. Such a patterning of magnetic bits can be referred to as a DC+/− servo scheme according to the present disclosure. Magnetic polarization of the servo layer is provided as vertical polarization, provided as perpendicularly with respect to the top surface 102 and bottom surface 104. In an embodiment, the first servo track 142 and the second servo track 144 are magnetically opposite in polarity in a segment of the first servo track 142 and the second servo track 144. Segment is defined here as a circular segment, formed with an angle θ with respect to the center 128 of the recording medium 100.

According to an embodiment, a magnetically positively polarized first servo track 142 is provided adjacent to a magnetically negatively polarized second servo track 144, on a servo layer 106 of a magnetic recording medium 100. The servo layer 106 is provided below a data recording layer 108 of a recording medium 100, with respect to a top surface 102 of the recording medium 100. Data recording track 134 is provided above the first servo track 142 and the second servo track 144, and such that a projection of the data recording track 134 on a plane parallel to the top surface 102 of the recording medium 100 can be equidistant between a projection of the magnetically positively polarized first servo track 142 and a projection of the magnetically negatively polarized second servo track 144 on a similar plane.

According to an embodiment of the present disclosure, the following describes the forming of the magnetically positively polarized first servo track 142 and the magnetically negatively polarized second servo layer 144. In an embodiment, the recording media is intended to be part of an ultra-high density HDD, where areal density is intended to be high for the provision of greater data recording capability. In supporting the increase in density, bit-patterning, in providing the magnetically positively polarized first servo track 142 and the magnetically negatively polarized second servo layer 144, is carried out.

As mentioned, recording medium 100 is a magnetic medium, which allows storage of data as tiny areas of either positive or negative magnetization on layers of the medium 100. Each tiny area represents a "bit" of information. In each layer, the bits are written closely-spaced to form circular tracks. A plurality of annular tracks is provided in each layer. In an embodiment, there are millions of bits on each track and many tens of thousands of tracks on each disk surface.

According to an embodiment, perpendicular recording is used in forming and operating the recording medium 100. In perpendicular recording, the "magnetic bits" point up or down perpendicular to the disk surface. Further, in bit patterning, magnetic cells are provided and magnetized, each cell storing or including one bit per cell, which allows much higher areal density as well as thermal stability.

Figure 2:
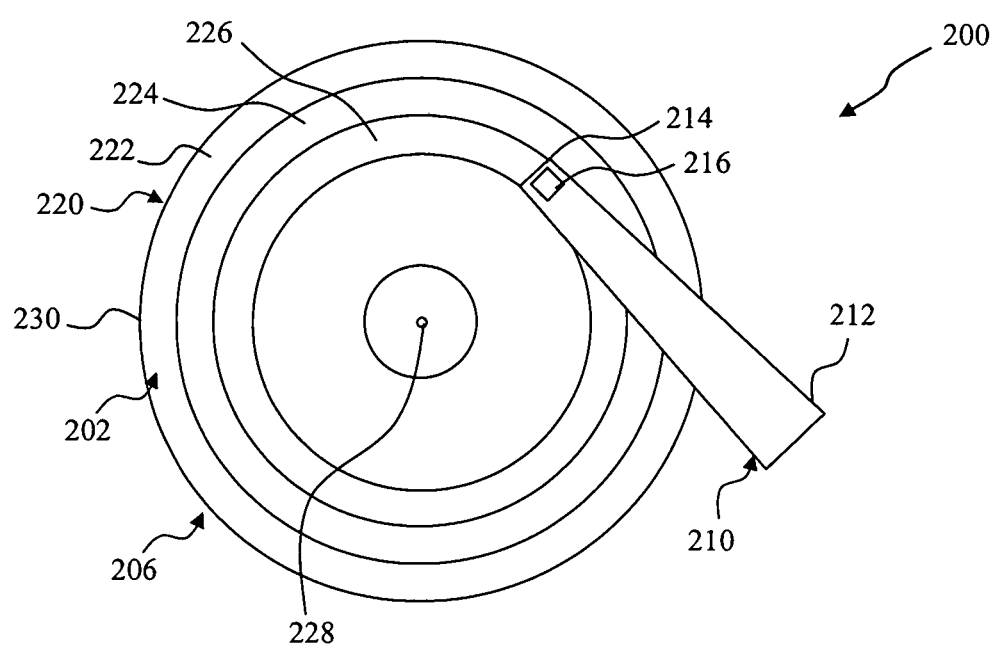
FIG. 2 illustrates a system for writing a servo track, according to an embodiment.

FIG. 2 illustrates a system for writing a servo track, according to an embodiment. A servo track writer 210 is provided to write on or prepare a dedicated servo layer 206 of a recording medium 200, to provide a servo system, according to an embodiment. Writing on the servo layer to provide the servo system is carried out in the manufacturing of the HDD, and a written or prepared servo system is not overwritten during normal operation of the HDD. Servo track writer 210 includes a flexure arm 212 with a writing head 214 at a distal end of the flexure arm 212, the writing head 214 including a writing element 216 on a surface of the writing head 214 directed towards a recording medium 200.

In use, the servo track writer 200 prepares the servo layer 206 by writing onto the servo layer 206, i.e. in providing an order to the magnetic bits on the magnetic servo layer 206. Additionally, the writing head 214 of the servo track writer 210 writes a plurality of servo tracks 220 on the servo layer 206 of the recording medium 200. Typically, the servo track writer 200 writes the plurality of servo tracks 220 from the outside diameter 230 of the recording medium 200 inwards to the center 228 or an inner diameter 232 of the medium. In other embodiments, the servo track writer 200 writes the plurality of servo tracks 220 from the center 228 or from an inner diameter of the recording medium 200 to the outer diameter of the recording medium 200.

Each servo track 220 written by the servo track writer 210 is intended to be of a specific track width w. In writing the each servo track 220 on the servo layer 206, the servo writing head 214 carries out a writing task for at least one revolution of the recording medium 200 about a rotational axis at the center 228 and perpendicular to a top surface 202 of the recording medium. During the writing task, an electrical current is passed in the servo track writer 200 to the writing head 214, which creates a magnetization field that magnetically directionally organizes the magnetic bits on the servo layer 206. A control module (not shown) is provided to control the electrical current characteristics for provision to the writing head.

According to an embodiment, a 50 mA electrical current is provided to the writing head 214 for magnetically writing onto the servo layer 206. In writing a magnetically positively polarized first servo track 222, a direct current (DC) of 50 mA is applied to the writing head 214, which subsequently writes the first servo track 222 in which the magnetic bits in the first servo track 222 are unidirectionally polarized. Upon carrying out the writing task for at least one revolution of the recording medium 200, the annular continuous first servo track 222, which is positively magnetically polarized, is formed. It is noted that the magnetically positively polarized first servo track 222 forms a resultant magnetic field, in this case reflecting the positive direction of the individually magnetized bits.

After completing the writing task in writing the first servo track 222, the flexure arm 212 of the servo track writer 210 is controlled by a control module configured to control the servo track writer 210, to shift radially towards the center 228 of the recording medium 200, by a distance of w. In other words, after writing the first servo track 222, the track head 214 carried by the flexure arm 212 is shifted inwards to write a second servo track 224. It is noted that the shift or translation of the head 214 is by a factor of w, to provide a plurality of equally spaced servo tracks 220. This further means that there is no overwriting of the first servo track 222 in the writing of the second servo track 224 according to the present embodiment.

After being translated by a distance or factor of w towards the center 228 of the recording medium, the servo track writer 210 is in position to write a second servo track 224. In writing a second magnetically negatively polarized servo track 224, a DC constant current of −50 mA is applied to the writing head 214, which subsequently writes the second first servo track 224 in which the magnetic bits in the second servo track 224 are unidirectionally polarized.

In carrying out the above writing tasks in writing the first servo track 222 and the second servo track 224, the servo track writer 210 forms an adjacent pair of continuous annular servo tracks 222 and 224, which are magnetically oppositely polarized, positively and negatively. The servo track writer 210 further carries on the writing tasks in forming a subsequent magnetically positively polarized servo track 226. A resultant plurality of alternatively magnetically polarized servo tracks are thereafter formed at the completion of writing tasks by the servo track writer 210.

According to an embodiment, servo positioning information is concurrently carried out during the writing task of the servo track writer 210, in forming a unidirectionally magnetically polarized track 220 on the servo layer 206. Writing of servo positioning information is well-known in the art and will not be discussed in this present disclosure. Alternatively, writing of servo positioning information is carried after a first run of writing tasks is carried on the recording medium 200, in forming a plurality of servo tracks 220 on a servo layer 206 in the recording medium 200. A subsequent writing run is carried out by the servo track writer 210 to write servo positioning information on the already formed servo tracks 220, simply encoding the servo information into predetermined bits on the servo tracks 220.

In any way the servo information is written onto each of the servo tracks 220 of the servo layer 206, the magnetization of the bits on which the servo information is written do not generally affect the overall magnetic field of each servo track formed by the unidirectional magnetic polarization of the remaining bits of the servo track not containing servo information. For purposes of the present disclosure, each servo track 220 is considered to be unidirectionally polarized, in view of the substantive number of bits which are unidirectionally polarized, in comparison to the number of bits carrying servo information. This is especially so in view of the resultant magnetic field of each of the servo tracks 220, each either directed positively or negatively, i.e. with the North pole of the magnetic field out from the recording medium or into the recording medium. According to an embodiment of the present disclosure, each servo track of a plurality of servo tracks provided on a servo layer of a recording medium is magnetically polarized positively or magnetically polarized negatively, which for the purpose of ease of definition also includes where the servo track is substantially magnetically polarized positively or substantially magnetically polarized negatively.

In describing the recording medium 100 in operation, reference is made back to FIG. 1D. As noted, data recording track 134 is provided above the magnetically positively polarized first servo track 142 and the magnetically negatively polarized second servo track 144. Further, the data recording track 134 is designated at the center of the first servo track 142 and the second servo track 144. It is noted that during operation, a read sensor or element in the read/write head 110 will pick up both the servo layer signal and the data layer signal.

Figure 3:
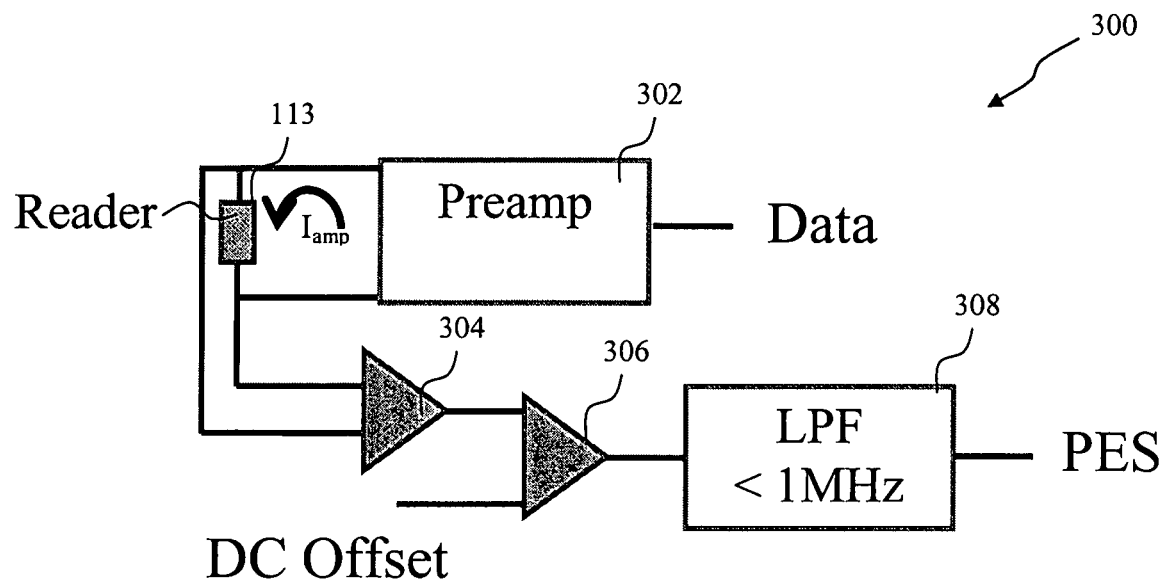
FIG. 3 illustrates a system for determining an error signal in the recording medium, according to an embodiment.

FIG. 3 illustrates a system 300 for determining an error signal in the recording medium, according to an embodiment. In system 300, a preamplifier 302 is provided, and electrically coupled to a read element 113 in a read/write head 110 according to an embodiment. Typically, the preamplifier 302 is a semiconductor chip configured to control a read/write head and corresponding read and write elements, and amplifies signals from/to them. In an embodiment, the preamplifier 302 will drive the read element with a constant current source $I_{amp}$ or constant voltage source.

The read element 113 thus carries out a read task or a read function on a data recording track 134 according to an embodiment. It is noted that the resistance of the read element 113 will change according to the magnetic field of written data on the data recording track 134, thus leading to a determination of written data. The AC-coupled design in the preamplifier 302 allows the DC and low frequency components (of which a PES will be described later) to be cut-off. Hence, the data signal is decoupled from the DC servo signal.

As earlier indicated, the read/write head 110 is configured to operate directly above a data recording track 134. Additionally, a center line 115 of the read/write head 110, corresponding to a center line 115 of the read element 113 of the read/write head 110, is aligned to the center line 134a of the data recording track during a read task carried out by the read/write head 110. Data recording track 134 is provided above the first servo track 142 and the second servo track 144, and further, can be equidistant between the magnetically positively polarized first servo track 142 and the magnetically negatively polarized second servo track 144 in a projection of the tracks onto a parallel plane.

In having a pairing of the first servo track 142 and the second servo track 144, a positive magnetic field as resultant from the magnetically positively polarized first servo track 142 is provided next to a negative magnetic field as resultant from the magnetically negatively polarized second servo track 144. A total effective magnetic field is formed, and the read/write head 110 configured to carry out a read or write task on the recording medium 100 operates under effect of the total effective magnetic field.

In order to measure a PES, with respect to the servo layer 106, a differential amplifier 304 is provided in the system 300, to measure the voltage or current changes as a result of reader resistance changes due to the effect of the total effective magnetic field, and with respect to any off-center deviation of the center line 115 of the read element 113 from the center line 134a of the data recording track 134. The center line 134a relates to the interface between the magnetically positively polarized first servo track 142 and the magnetically negatively polarized second servo track 144. In an embodiment, a measurement of a resistance of the reader or sensor is taken. In an embodiment, a measurement of a resistance in the sensor head is taken. In an embodiment, a measurement of a voltage in the sensor head is taken. In an embodiment, a measurement of a voltage across a reader sensor is taken, the reader sensor in a sensor head.

In the instance of lateral deviation from the center line 134a by the read/write head 110, the magnetoresistive read element 113 interacts with the total effective magnetic field of the first servo track 142 and the second servo track 144 and generates a resultant potential difference across the magnetoresistive read element 113, in accordance to Faraday's law. The resultant potential difference can relate to the amount of lateral deviation from the center line 134a and determination of the direction of deviation can also be extracted easily by the polarity of the potential difference, in relation to the opposing polarity of the magnetic field on each of the first servo track 142 and the second servo track 144.

According to an embodiment, a DC offset circuit 306 is provided in the system 300, to offset the baseline voltage due to inherent reader resistance. In an embodiment, the DC offset circuit 306 is an operational amplifier, configured to offset the baseline voltage due to the inherent reader resistance. In other embodiments, the DC offset circuit can be a high pass filter with a low cutoff frequency. In further embodiments, the DC offset circuit is a high pass filter with very low cutoff frequency, of about 50 Hz, or less than 50 Hz.

Further, in seeking to determine a PES, a low pass filter 308 is provided and coupled to the output of the DC offset circuit 306. In an embodiment, the low pass filter 308 is provided with cutoff frequency of about 1 MHz, and attenuates signals with frequencies higher than the cutoff frequency. In other embodiments, the cutoff frequency can be less than 1 MHz, perhaps about 100 kHz, but sufficient to extract a PES from the resultant signal therefrom. A PES is then extracted from the signal resultant from the low pass filter 308. As the data layer is written at a higher frequency, aspects of the data recording or data signal, are effectively filtered out by the low pass filter 308. The low pass filter 308 output is thus decoupled from the data signal or interference signal from the data recording layer and during a write task.

It is noted that a recording medium and a system for determining an error signal according to the present disclosure is different from other systems and methods in the art for determining PES. Of note, the system according to the present disclosure implements a simple hardware PES detection scheme, while systems and methods in the art rely on digital signal processing to obtain a PES. The simple hardware detection scheme allows for ease of determining the PES while similarly providing a better decoupling between the servo signal and the data signal. Additionally, the PES signal obtained by way of a system according to an embodiment of the present disclosure provides a better PES for both the read and write processes as there is less data interference to the servo signal.

Figure 4:
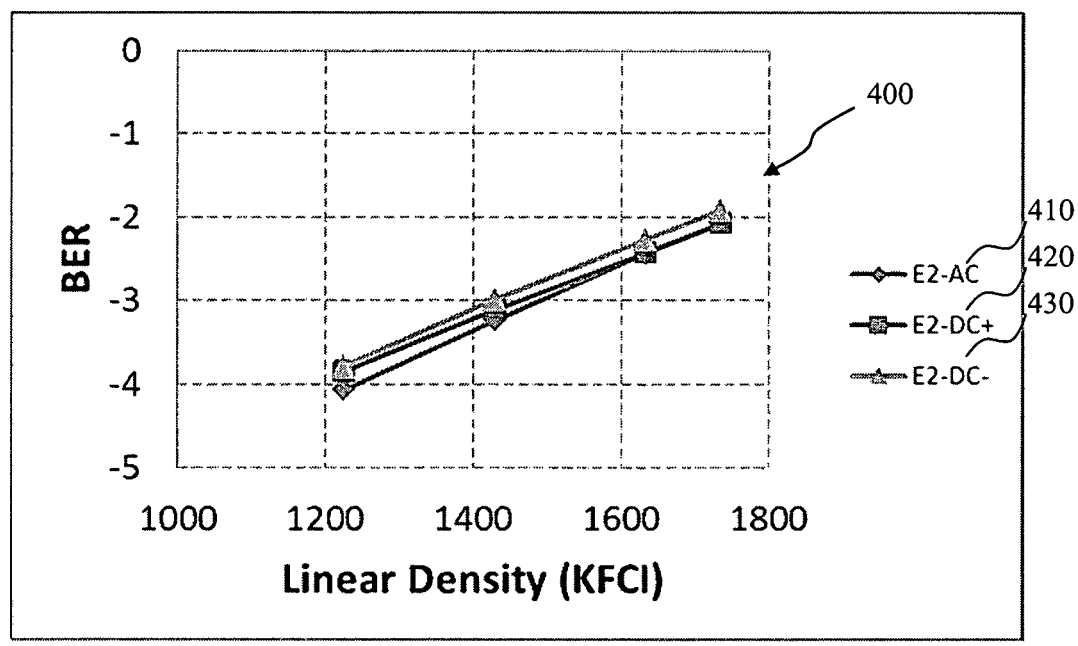
FIG. 4 illustrates a plot of an on-track BER study.

FIG. 4 illustrates a plot of an on-track BER study. Plot 400 charts the bit-error rate (BER) of a portion of a servo layer against a linear density. Linear density is defined as a kilo-flux per inch (KFCI), or how much flux can there be in the length of an inch. Further, linear density readings are comparable to writing frequency readings in that they are interchangeable with a factor depending on a radius of the recording medium. Plot 400 compares the BER 410 in the servo layer 106 of a recording medium 100 which is of an AC servo background according to an embodiment. Further, a BER 420 of a DC+ servo track in a servo layer in a recording medium is provided in the plot. In an embodiment, BER 420 is taken in the center of the DC+ servo track. BER 430 of a DC− servo track in the servo layer is provided in the plot. In an embodiment, BER 430 is taken in the center of the DC− servo track. The BER (bit-error rate) is a statistical measure of the effectiveness of all the electrical, mechanical, magnetic, and firmware control systems working together to write (or read) data.

In obtaining BER 410, it is noted that the servo layer 106 includes a plurality of magnetically positively polarized servo tracks and magnetically negatively polarized servo tracks being paired adjacent to each other. In the comparison BER 410 of AC servo background, it is noted that the provided servo layer includes no bit patterning and the existing net magnetization of servo tracks in the servo layer would be equivalent to zero, i.e. there is a randomization of the magnetization of bits in the servo layer, and leading to a null resultant magnetic field.

It can be observed from BER plots 410, 420 and 430 that the BER 420 and 430 of the recording medium according to the present disclosure is very close to the BER 410 of the AC servo layer case. This can indicate that the servo scheme according to the present disclosure provides a simple solution to decouple the servo signal from interfering with the data signals.

Figure 5:
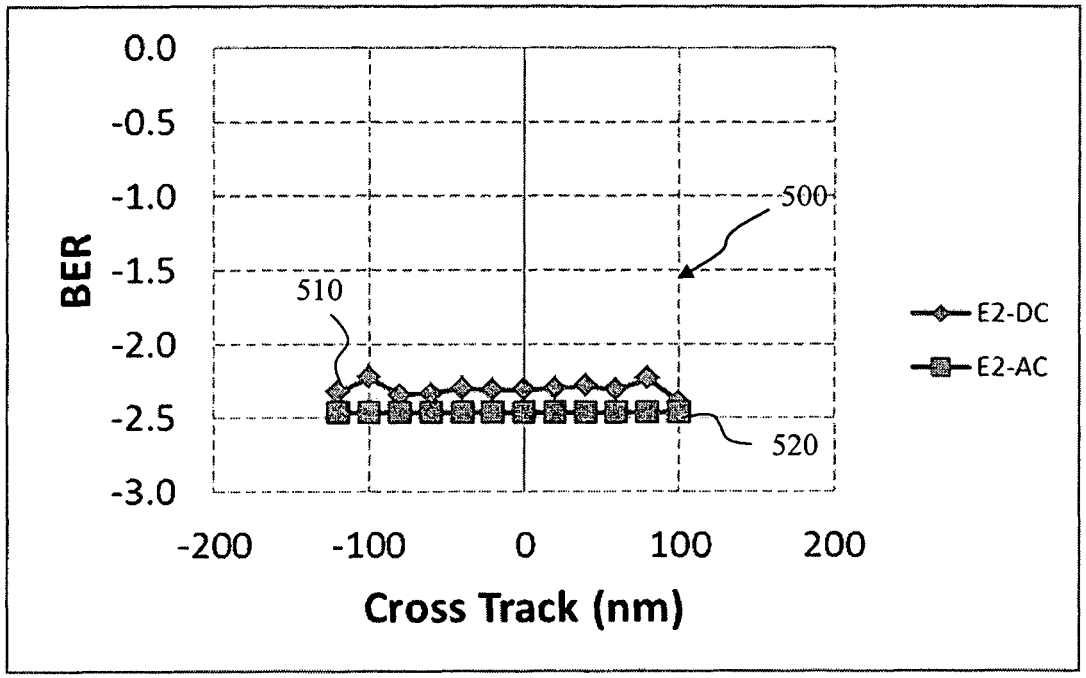
FIG. 5 illustrates a plot of a cross-track BER study.

FIG. 5 illustrates a plot of a cross-track BER study. Plot 500 compares the BER 510 in the servo layer of a recording medium according to an embodiment and the BER 520 of a servo layer in a recording medium which is of an AC servo background. Plot 500 provides a measure of the BER along the cross-track. In an embodiment, −100 nm is at the center of DC+ servo track and +100 nm is at the center of DC− servo track.

It can be observed that there is influence in cross track direction is not of much significance. Further, a deduction can be made from comparative examples that BER in the servo layer of a recording medium according to an embodiment can be better than the BER obtained in frequency based servo systems, which are can be taken to include an AC servo background.

Figure 6:
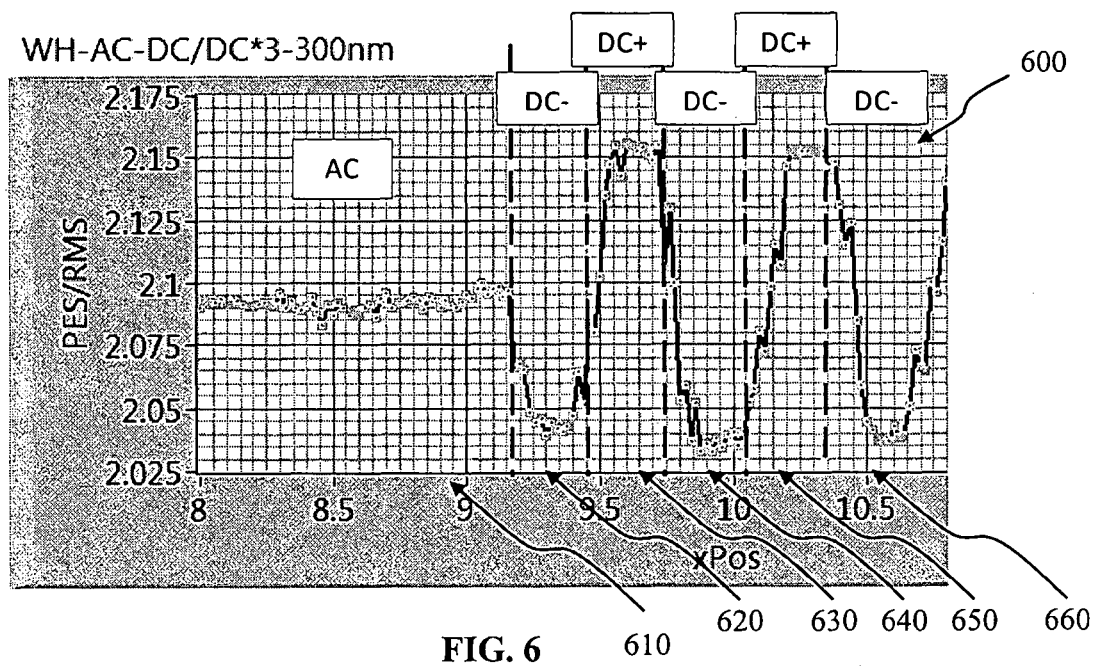
FIG. 6 shows a PES transfer function along a portion of the servo layer.

FIG. 6 shows a PES transfer function along a portion of the servo layer. Further, plot 600 shows the PES transfer function cross-track along a portion of the servo layer. At a portion 610, it can be seen that the PES transfer function indicates that a read/write head is over an AC region. Portions 620, 640 and 660 indicate the read/write head over a magnetically negatively polarized servo track, resulting in a PES function including a substantially level negative peak amplitude, which is then identified as a DC− region or servo track. Portions 630, 650 indicate that the read/write head is over a magnetically positively polarized servo track, resulting in a PES function including a substantially level positive peak amplitude, which is then identified as a DC+ region or servo track.

It can be noted that the amplitudes of the PES function 600 when the read/write head passes over different magnetically positively or negatively polarized servo tracks are substantially identical.

Figure 7:
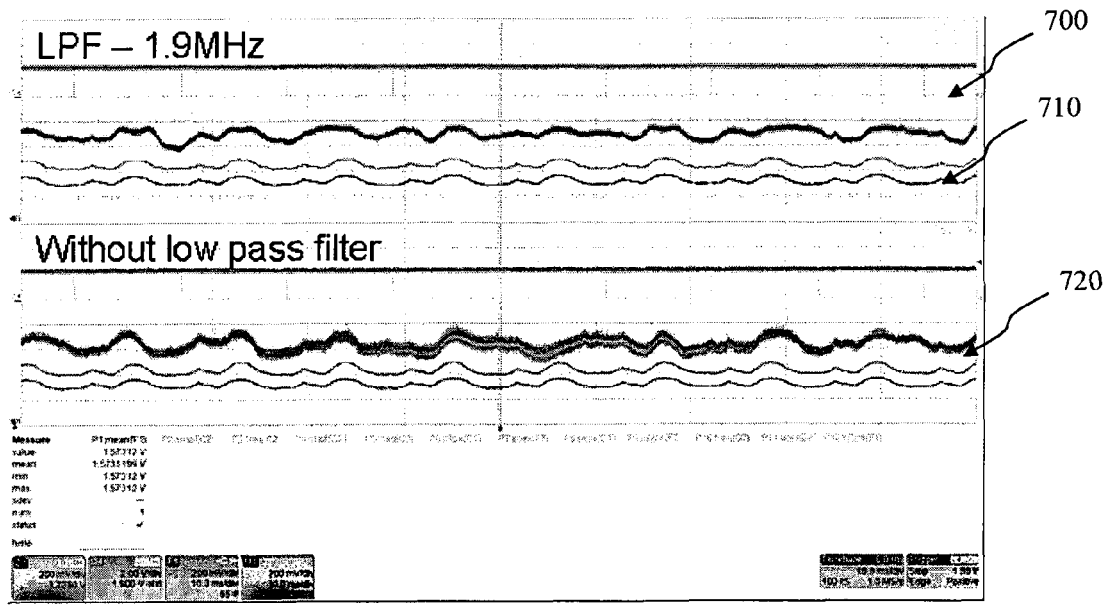
FIG. 7 shows a continuous PES signal during a write task carried out by the read/write head.

FIG. 7 shows a continuous PES signal during a write task carried out by the read/write head. The write task is carried out by the read/write head over a data recording track, and particular in between a magnetically positively polarized servo track and a magnetically negatively polarized servo track. The writer is in a continuous writing mode.

Plot 710 shows that instantaneous PES signals are clean after applying a low pass filter with a cut-off frequency of 1.9 MHz according to an embodiment. Plot 720 shows instantaneous PES signals obtained without a low pass filter. Plot 720 shows a clear writing mode coupled into the PES signal. It is noted that both cases give similar RRO performance after an averaging of 100 times is applied to the signals.

Figure 8:
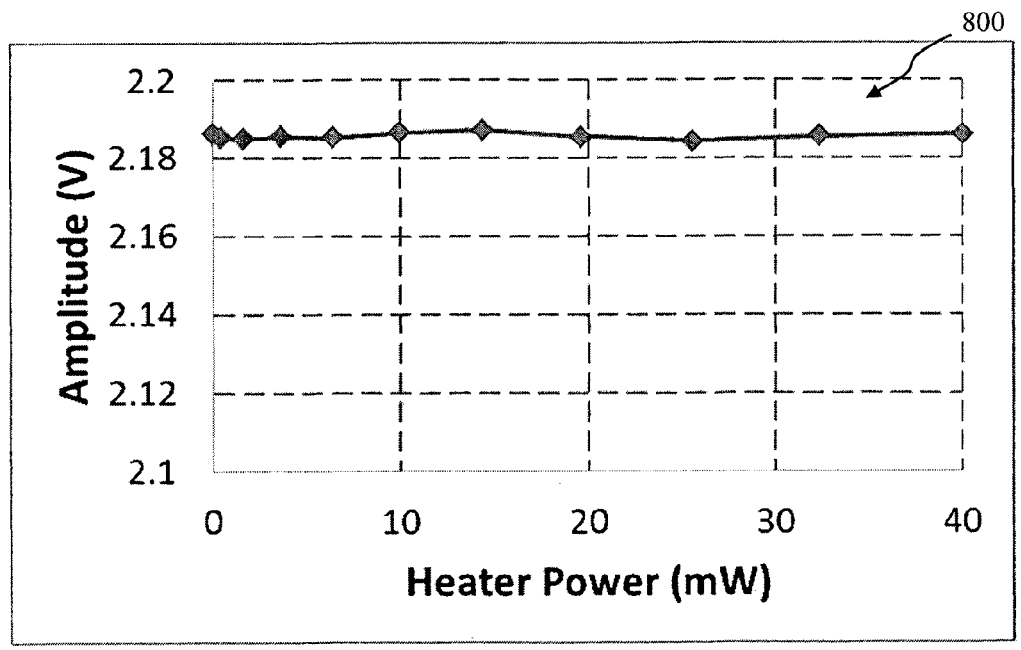
FIG. 8 shows a plot of an amplitude of a PES with respect to a fly height of a slider head according to an embodiment.

FIG. 8 shows a plot 800 of an amplitude of a PES with respect to a fly height of a slider head according to an embodiment. A heater (not shown) is provided in a flexure armature or an actuator arm according to an embodiment. When current is supplied to the heater, the read/write head is expanded by the heat radiating from the heater such that the profile of the read/write head changes. Specifically, a portion of the read/write head is expanded by heat produced by the heater and protrudes towards the recording medium. In other words, a fly height of the slider or read/write head above a top surface of the recording medium is decreased when current is increasingly supplied to the heater.

Plot 800 shows that a change in fly height has relatively little to no impact towards the PES obtained in accordance to an embodiment of the present disclosure. According to the Wallace spacing loss equation:

$$V = Ce^{\frac{2\pi d}{\lambda}}$$

where V relates to a readback amplitude, λ to wavelength, and d to the spacing distance or fly height. When the servo signal is written in DC, the wavelength λ tends to infinity. As such, any change in spacing d is relatively insignificant to the amplitude V.

Figure 9:
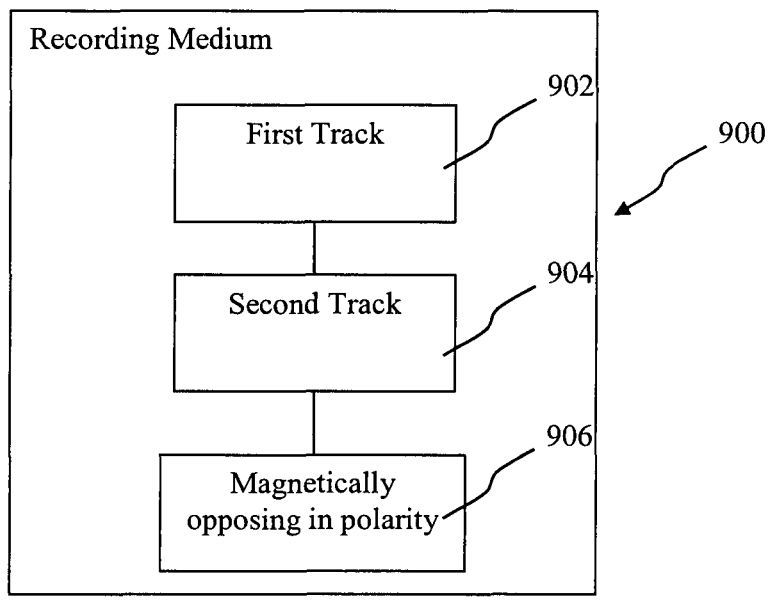
FIG. 9 illustrates a schematic of a recording medium according to an aspect of the present disclosure.

FIG. 9 illustrates a schematic of a recording medium 900 according to an aspect of the present disclosure. Recording medium 900 can include a first track 902, which can be a first annular servo track, provided on a first layer of the recording medium. Recording medium 900 can also include a second track 904, which can be a second annular servo track 904, provided on the first layer of the recording medium, and adjacent to the first track 904. In 906, the first track 902 and the second track 904 are magnetically opposing in polarity.

In an embodiment, the recording medium further includes a third annular track configured to store data, the third track annular provided on a second layer of the recording medium.

In an embodiment, the second layer of the recording medium is provided proximal to a top surface of the recording medium.

In an embodiment, the second layer of the recording medium is provided between the top surface of the recording medium and the first layer.

In an embodiment, the third annular track is provided equidistant between the first annular servo track and the second annular servo track when the first annular servo track, the second annular servo track and the third annular track are projected onto a plane parallel the first layer.

In an embodiment, the first, second and third annular tracks are equal in width, and the third annular track is provided half a track width from the first annular servo track and the second annular servo track.

In an embodiment, the recording medium further includes a plurality of annular tracks provided on the second layer, corresponding to the first annular servo track and the second annular servo track.

In an embodiment, a pair of annular data tracks are provided on the second layer, corresponding to the first servo track and the second annular servo track, the width of the annular data tracks being half of the width of the first servo track.

Figure 10:
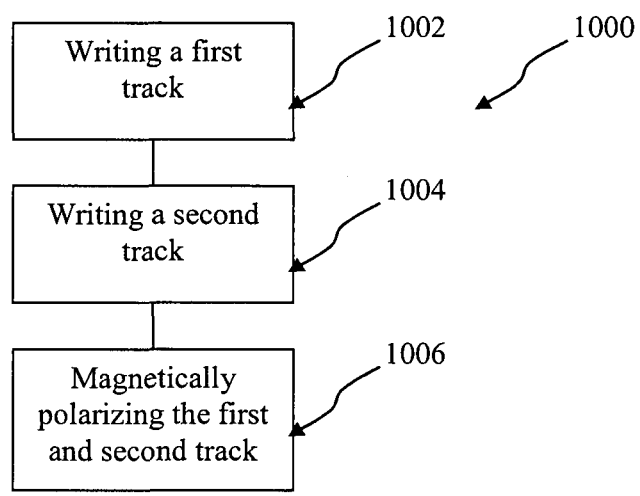
FIG. 10 illustrates a block diagram of a method according to an aspect of the present disclosure.

FIG. 10 illustrates a block diagram of a method 1000 according to an aspect of the present disclosure. Method or process 1000 can be a method of preparing a recording medium. In 1002, the method can include writing a first track, which can be a first annular servo track, on a first layer of the recording medium, the first annular servo track having a magnetic polarization of a first direction. In 1004, the method can include writing a second track, which can be a second annular track, on the first layer of the recording medium, the second annular servo track having a magnetic polarization in a second opposite direction, the second track adjacent to the first track.

In an embodiment, writing a first annular servo track includes polarizing magnetic bits in a unidirectional positive polarization, and writing a second annular servo track includes directionally polarizing magnetic bits in a unidirectional negative polarization.

In an embodiment, writing the first annular servo track includes passing an electrical current through a write element for magnetizing a magnetic bit.

In an embodiment, writing the first annular servo track includes passing a positive direct current through the write element, and writing the second annular servo track includes passing a negative direct current through the write element.

Figure 11:
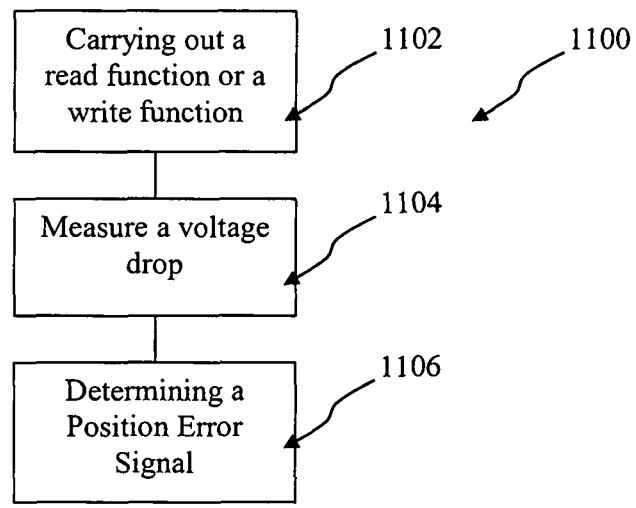
FIG. 11 illustrates a block diagram of a method according to an aspect of the disclosure.

FIG. 11 illustrates a block diagram of a method 1100 according to an aspect of the disclosure. Method 1100 can be a method of determining a signal for a sensor head interacting with a recording medium. The recording medium can include a data track provided on a data layer, corresponding to a first servo track and a second servo track provided on a servo layer, the first servo track and the second servo track magnetically opposite in polarity. In 1102, the method can include carrying out a read function or a write function, further, any one of a read function and a write function with the sensor head on the data track. In 1104, the method can include measuring a voltage, additionally, measuring a voltage in the sensor head while carrying out the any one of a read function and a write function. In 1106, the method can include determining a position error signal, further, determining a position error signal of the sensor head based on a change in the voltage measurement.

In an embodiment, the method further includes determining a change in a resistance of the sensor head while carrying out the any one of a read function and a write function.

In an embodiment, the method further includes correlating the change in resistance with an effective magnetic field strength to determine an off-center deviation of the sensor head while carrying out the any one of a read function and a write function.

In an embodiment, determining a position error signal includes addressing an inherent sensor head resistance in a change in the voltage measurement.

In an embodiment, addressing the inherent sensor head resistance includes offsetting a baseline voltage in the voltage measurement.

In an embodiment, addressing the inherent sensor head resistance includes filtering the voltage measurement with a high pass filter.

In an embodiment, determining a position error signal of the sensor head includes filtering the voltage measurement with a low pass filter.

Figure 12:
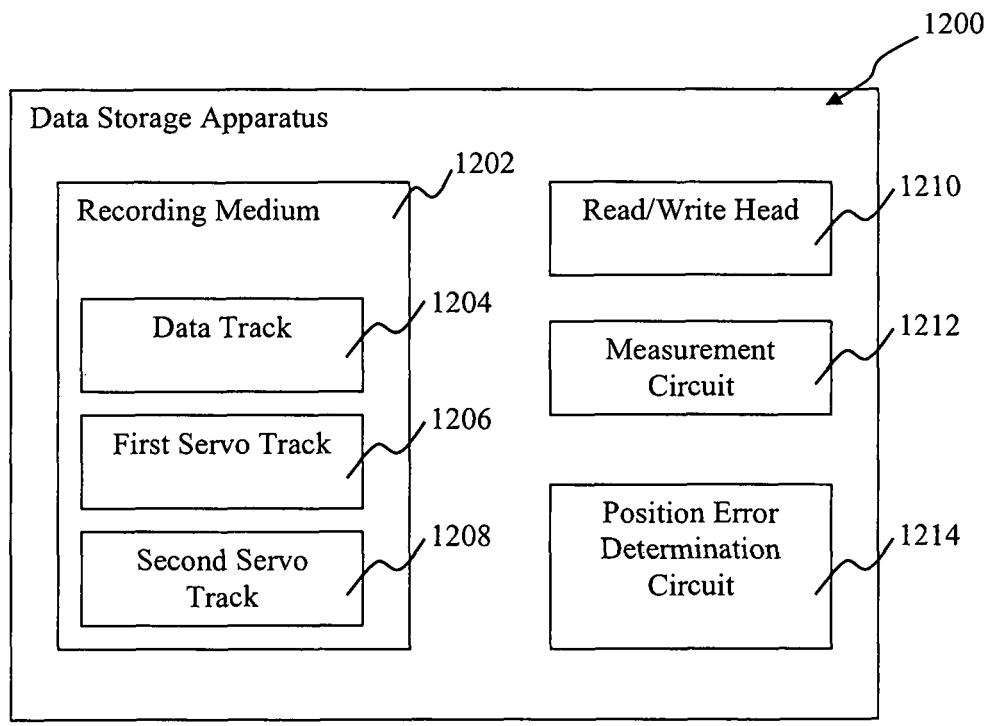
FIG. 12 illustrates a data storage apparatus according to an aspect of the disclosure.

FIG. 12 illustrates a data storage apparatus 1200 according to an aspect of the disclosure. In 1202, the apparatus can include a recording medium. In 1204, the apparatus, particularly the recording medium in the apparatus, can include a data track. In 1206, the apparatus, particularly the recording medium in the apparatus, can include a first servo track. In 1208, the apparatus, particularly the recording medium in the apparatus, can include a second servo track. According to an aspect, the data track can be provided on a data layer corresponding to a first servo track and a second servo track provided on a servo layer, the first servo track and the second servo track magnetically opposite in polarity.

In 1210, the apparatus can include a sensor head. In an embodiment, the sensor head is configured to carry out any one of a read function and a write function on the data track. In 1212, the apparatus can include a measurement circuit. In an embodiment, the measurement circuit can be configured to measure a voltage in the sensor head while carrying out the any one of a read function and a write function. In 1214, the apparatus can include a position error determination circuit. In an embodiment, the position error determination circuit can be configured to determine a position error signal of the sensor head based on a change in the voltage measurement.

According to an embodiment, there is provided a data storage apparatus including: a recording medium including: a data track provided on a data layer corresponding to a first servo track and a second servo track provided on a servo layer, the first servo track and the second servo track magnetically opposite in polarity; a sensor head configured to carry out any one of a read function and a write function on the data track; a measurement circuit configured to measure a resistance in the sensor head while carrying out the any one of a read function and a write function; and a position error determination circuit configured to determine a position error signal of the sensor head based on a change in the resistance.

In an embodiment, a width of the data track is equal to or narrower than a width of the first servo track and a width of the second servo track.

In an embodiment, a change in the voltage in the sensor head relates to a lateral deviation of the sensor head in carrying out the any one of a read function and a write function.

In an embodiment, the measurement circuit includes a differential amplifier placed across the sensor head to measure a change in voltage in the sensor head while carrying out the any one of a read function and a write function.

In an embodiment, the apparatus further includes a DC offset circuit configured to address an inherent sensor head resistance in the voltage measurement.

In an embodiment, the apparatus further includes a high pass filter configured to address an inherent sensor head resistance in the voltage measurement.

In an embodiment, the high pass filter includes a cutoff frequency of 50 Hz.

In an embodiment, the position error determination circuit includes a low pass filter configured to filter the voltage measurement.

In an embodiment, the low pass filter includes a cutoff frequency of 1 Mhz.

According to an aspect of the present disclosure, there is provided a recording medium including: a first annular servo track provided on a first layer of the recording medium; and a second annular servo track provided on the first layer of the recording medium and adjacent to the first annular servo track; wherein a bit randomization portion is provided in an annulus formed by an exterior perimeter of the first annular servo track and an interior perimeter of the second annular servo track.

Perspectively, a buried layer dedicated servo system or scheme can be implemented and have previously been observed to improve the track following capability during both read and write process in the operation of a HDD. However, a concern in such a scheme is in addressing a servo interference signal which may degrade data signal integrity. A scheme or system is provided as a simple way to minimize this degradation.

According to an embodiment, an AC erase region or a bit randomization portion can be provided with the buried layer dedicated servo system or servo layer. Additionally, an AC erase region can be provided with, in, on, among, adjacent, part of, or between a first servo track and a second servo track in the servo layer.

Figure 13:
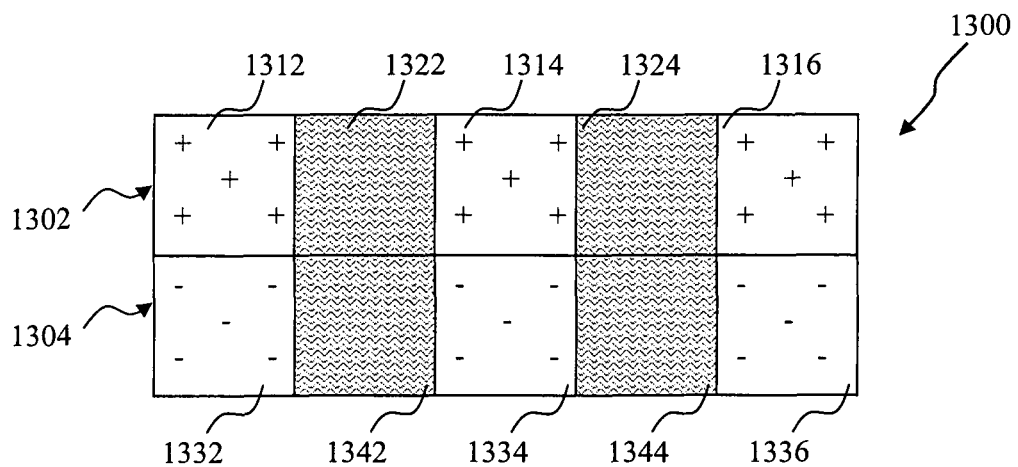
FIG. 13 illustrates top down view of a portion of a pair of servo tracks according to an embodiment.

FIG. 13 illustrates top down view of a portion of a pair of servo tracks according to an embodiment. Servo layer 1300 can be understood as a buried servo layer, which is provided under a top or read/write surface of a recording medium and further under a data recording layer, according to an embodiment. Intermediate layers can also be provided in between functional layers in the recording medium. As indicated above, the servo layer 1300 is provided to store servo information and the data recording layer is provided to store user data. Further, the data recording layer can also be provided for storing servo information, according to an embodiment. As earlier indicated, the recording medium is a magnetic medium, and further, a ferromagnetic medium. Further, the magnetic medium allows storage of data as tiny areas of either positive or negative magnetization on layers of the recording medium. Each tiny area represents a "bit" of information. In each layer, the bits are written closely-spaced to form circular or annular tracks. In an embodiment, there are millions of bits on each track and many tens of thousands of tracks on each disk surface.

A plurality of continuous annular tracks is provided on a layer in the recording medium or disk, each of which runs parallel to a circumference of the circular recording medium. The plurality of annular tracks has a common center at a central axis of the disk, which runs perpendicularly through the disk, and forms a rotational axis of the disk. Each annular track can be understood to have or be bounded by an interior perimeter, proximal or closer to the center of the disk, and an exterior perimeter, proximal or closer to the circumference of the disk. As can be noted, each annular track can be considered an annulus or considered in shape an annulus. Further, as servo systems rely on paired servo tracks for position identification, a pair of servo tracks can be considered to form an annulus. In other words, an annulus is formed by an exterior perimeter of an annular servo track proximal to the circumference of the disk and an interior perimeter of an adjacent servo track proximal to the center of the disk. As earlier described, the servo tracks on the servo layer, can be formed by a writing process carried out by a servo track writer. In operation, the recording medium is rotated about the central rotational axis.

FIG. 13 illustrates a portion of a first servo track 1302, or a first annular servo track, provided on, or as part of the servo layer 1300 of the recording medium. Also illustrated is a portion of a second servo track 1304, or a second annular servo track, provided on, or as part of the servo layer 1300 of the recording medium.

According to an embodiment, the servo layer 1300 can be provided with a servo pattern. A servo pattern can be formed by bit patterning, wherein magnetic bits in the servo layer of the recording medium are magnetized to a particular direction, according to a predetermined pattern. Particularly, the servo tracks in the servo layer can be formed by bit patterning according to a bit pattern. According to an embodiment, each servo track in the servo layer is provided with a bit pattern. The bit pattern on a track is complementary to a bit pattern on an adjacent track. Having servo tracks with bit patterns, which can be complementary bit patterns, facilitates the obtaining of a position error signal which seeks to identify a deviation in position of a read/write head with respect to a data track under processing.

According to an embodiment, a first servo track 1302 includes a first bit pattern. Further, a second servo track 1304 includes a second bit pattern. In an embodiment, the first servo track 1302 includes a first bit pattern including a unidirectional positive polarization and the second servo track 1304 includes a second bit pattern including a unidirectional negative polarization. According to an embodiment, the magnetically positively polarized first servo track 1302 is provided adjacent to the magnetically negatively polarized second servo track 1304, on a servo layer 1300 of a magnetic recording medium.

According to an embodiment, a bit randomization portion 1322 is provided in the first servo track 1302. The bit randomization portion 1322 can also be known as an AC erase region. In the embodiment, the bit randomization portion 1322 can be considered a bit pattern or a part or portion of a bit pattern. In preparing or when writing the servo tracks on a servo layer 1300, portions of bit randomization are included, as part of a bit pattern for the servo tracks. In the bit randomization portion, the magnetic bits of the magnetic medium are magnetized such that there is a general randomization of a magnetic bit direction of each magnetic bit. As a result, there is a net magnetic field with a negligible magnetic field strength and an indiscernible magnetic field direction as according to the bit randomization portion.

In an embodiment, bit randomization portions 1322 and 1324 are provided in first servo track 1302. The bit randomization portions 1322 and 1324 are provided with patterned first servo track portions 1312, 1314, 1316 to form a first servo track 1302. As indicated above, first servo track 1302 includes a first bit pattern including a unidirectional positive polarization. First servo track 1302 includes magnetically positively polarized first servo track portions 1312, 1314, 1316. As can be noted, a bit randomization portion is provided in an annulus formed by the first servo track 1302 and the second servo track 1304. Additionally, a bit randomization portion is provided in an annulus formed by an exterior perimeter of the first annular servo track 1302 and an interior perimeter of the second annular servo track 1304.

In an embodiment, the first servo track 1302 includes bit randomization portions 1322 and 1324 interspersed or alternated with patterned first servo track portions 1312, 1314, 1316.

In an embodiment, the first servo track 1302 includes bit randomization portions 1322 and 1324 of a size similar to that of patterned first servo track portions 1312, 1314, 1316, i.e. the bit randomization portions and the patterned first servo track portions have the same length, in view of a standard track width w of the first servo track. In such a case, it can also be understood that the bit randomization portions are provided periodically or according to a certain regular period. In other embodiments, the size of the bit randomization portions and the first servo track portions can be different. For example, a patterned first servo track portion of length l may be provided adjacent to a bit randomization portion of length 0.5 l. Alternatively, a patterned first servo track portion of length l may be provided adjacent to a bit randomization portion of length 0.5 l, which is subsequently provided adjacent to a patterned first servo track portion of length 2l. The size of the bit randomization portions with respect to that of the patterned first servo track portions can be determined during a design phase of the recording medium.

In an embodiment, the second servo track 1304 includes bit randomization portions 1342 and 1344 interspersed or alternated with patterned second servo track portions 1332, 1334, 1336. In an embodiment, bit randomization portions 1322 and 1324 are similar in size with bit randomization portions 1342 and 1344. Further, patterned first servo track portions 1312, 1314, 1316 are similar in size with patterned second servo track portions 1332, 1334, 1336. In other embodiments, each of the bit randomization portions and patterned servo track portions are of different sizes or lengths, according to a recording medium design.

It is stated that including portions of bit randomization within the bit pattern of the servo track affects the overall bit patterning of the servo track, for example where a bit randomization portion is provided. As such, the present disclosure references such bit pattern as a hybridized bit pattern, i.e. the first bit pattern of the embodiment is understood to include a hybrid unidirectional positive polarization scheme. According to an embodiment, the first servo track 1302 and the second servo track 1304 form part of a hybrid unidirectional positive-negative polarization scheme, or a hybrid DC+/− servo scheme. Additionally, as the inclusion of bit randomization portions are in accordance to a certain regular period in the bit pattern according to the embodiment, the bit pattern can be referred to as a DC servo hybrid with F1 servo or DC*F1, where F1 refers to the frequency in which a bit randomization portion is provided. In such a scheme, AC regions are inserted into DC+ and DC− tracks respectively in the same periodical manner to give an additional frequency information.

According to an embodiment, such a bit randomization portion or a plurality of bit randomization portions is deliberately included into the servo track to provide an improvement to the buried layer servo system. In an embodiment, bit randomization portions are added periodically in the down-track direction of a servo track. The bit randomization portions reduce non-linear transition distortion arising from bit transition changes from one polarity to another polarity of a HDD operating a frequency-based servo position identification process.

According to an embodiment, servo layer 1300 can be prepared by a servo track writer. Additionally, first annular servo track 1302 and second servo track 1304 can be prepared or written by a writing head in a servo track writer. The general servo writing process has been described earlier. In the embodiment, bit randomization portions are provided as part of a DC*F1 servo scheme. In this case, the bit randomization portions are provided in accordance to a predetermined frequency.

In a servo writing process, servo tracks are sequentially written by the servo track writer, in order to create or form a plurality of annular or concentric servo tracks in a servo layer of the recording medium. In a DC+/− servo scheme, as described above, a direct current is provided to a writing head of a servo track writer to write a magnetically positively polarized first servo track. The DC supplied to the inductive writing head such that a magnetic field of constant strength and direction is formed for magnetizing magnetic bits on the servo layer in writing the first servo track. The magnetic bits are unidirectionally polarized in a magnetically positive direction in the written first servo track.

In an embodiment, a hybrid DC+/− servo scheme, in various embodiments, a DC*F1 servo scheme, is to be written, in which portions of the first track 1302 are designated as to be positively polarized and portions of the second track 1304 are to be negatively polarized. In an embodiment, the bit randomization portions are to be written together with the patterned first and/or second patterned servo portions in forming the first and/or second servo track. In another embodiment, the bit randomization portions can be provided after the bit patterned tracks of the servo layer have been written. In such a case, the servo track writer simply overwrites the track portions, or in other words places the track portion to be bit randomized under a different magnetic field to change the alignment of the polarized magnetic bits.

Figure 14A:
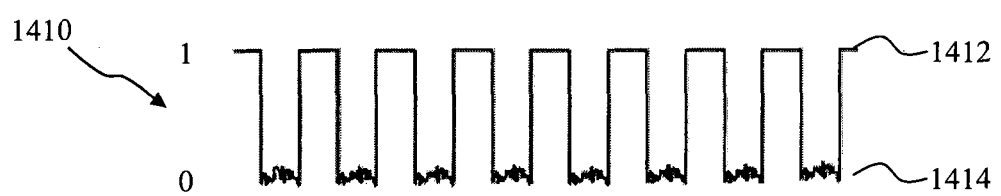
FIG. 14A illustrates a voltage waveform for writing a first servo track according to an embodiment.

FIG. 14A illustrates a waveform 1410 when reading a first servo track according to an embodiment. Additionally, waveform 1410 is resultant from a measurement taken by a reading head to a writing head of a read/write or sensor head, in considering or reading a magnetic field resultant from magnetized magnetic bits on a servo layer 1300, as part of a first annular servo track 1302. Further, the waveform 1410 is obtained from the reading or measurement of a bit patterned first annular servo track 1302 of a DC*F1 servo scheme.

In waveform 1410, with respect to time, a high "1" signal 1412 is obtained, in alternate with a low "0" signal 1414. It can be observed in such a situation that a reading head or reading sensor mounted on a read head registers a corresponding "1" signal 1412 resultant from the reading head when reading a first servo track, including a corresponding patterned first servo portion 1312, 1314 or 1316 on the servo layer 1300. It can be noted that the patterned first servo portion 1312 is a magnetically positively polarized portion, or a DC+ portion, which results in a "1" read signal. Conversely, a low "0" signal 1414 is obtained when the reading head is in operation over a bit randomization portion 1322 or 1324 on the servo layer. The bit randomization portion can also be referred to as an AC erase region.

Figure 14B:
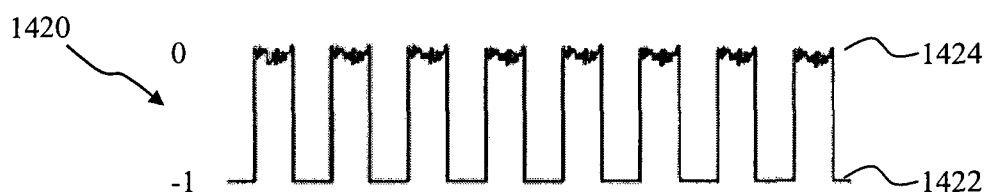
FIG. 14B illustrates a waveform voltage for writing a second servo track according to an embodiment.

FIG. 14B illustrates a waveform 1420 when reading a second servo track according to an embodiment. Similarly, waveform 1420 is resultant from a measurement taken by a reading head to a writing head of a read/write or sensor head, in considering or reading a magnetic field resultant from magnetized magnetic bits on a servo layer 1300, as part of a second annular servo track 1304.

In waveform 1420, with respect to time, a high "0" signal 1424 is obtained, in alternate with a low "−1" signal 1422. It can be observed in such a situation that a reading head or reading sensor mounted on a read head registers a corresponding "−1" signal 1422 is resultant from the reading head when reading a second servo track, including a corresponding patterned second servo portion 1332, 1334 or 1336 on the servo layer 1300. It can be noted that the patterned second servo portion 1332 is a magnetically negatively polarized portion, or a DC− portion, which results in a low "−1" read signal. Conversely, a high "0" signal 1424 is obtained when the reading head is in operation over a bit randomization portion 1342 or 1344 on the servo layer.

In an embodiment, a signal is generated for provision to a writing head of a servo track writer, in forming a magnetic field for magnetizing magnetic bits on a servo layer 1300 to form a first annular servo track 1302. Further, the signal is provided for writing a bit patterned first annular servo track 1302 of a DC*F1 servo scheme.

In an embodiment a positive DC current is alternated with a null current for writing a bit patterned first annular servo track. In an embodiment, when a positive DC current is provided to the writing head, a corresponding patterned first servo portion 1312, 1314 or 1316 can be written on the servo layer 1300. Conversely, when a null current is provided to the writing head, a bit randomization portion 1322 or 1324 can be written on the servo layer. A servo track writer control module is provided to control the electrical current characteristics provided to the inductive writing head.

In an embodiment, the positive DC input is a 50 mA DC current. In an embodiment, the null current input is a near-zero input current, in order to randomize the polarization direction of the magnetic bits. In an embodiment, a 50 mA input current is provided with a high frequency, for example in the order of 350 MHz, or any other high frequency sufficient for this purpose, is provided to the writing head in order to randomize the polarization of the magnetic bits. In an embodiment, the frequency of the input current is set to the maximum frequency available to the servo track writer. When such a high frequency signal is provided to the writing head, the resultant magnetic field creates a distorted randomized pattern in the magnetic bits being written on or magnetized, such that any net resultant magnetic field in the bit randomization portion has a negligible magnetic field strength and an indiscernible magnetic field direction.

In an embodiment, a negative DC current is alternated with a null current for writing a bit patterned second annular servo track. In an embodiment, when a negative DC current is provided to the writing head for writing a second servo track, a corresponding patterned second servo portion 1332, 1334 or 1336 can be written on the servo layer 1300. Conversely, when a null current is provided to the writing head, a bit randomization portion 1342 or 1344 can be written on the servo layer. According to an embodiment, a negative DC current is a −50 mA DC current. It is noted that such a value is relative to the type of servo writer being used to write the servo layer. In an embodiment, a null current is a DC current of near 0 mA, or substantially zero. In an embodiment, a high frequency signal at 50 mA current can be used to create the bit randomization portion.

In an embodiment, the alternate provision of a positive or a negative DC current and a null current can be provided as according to a regular period or at a fixed frequency. This certain frequency is referred to in the nomenclature of the servo pattern as DC*F1. In other embodiments, the frequency of writing bit randomization portions may vary downtrack.

Figure 15A:
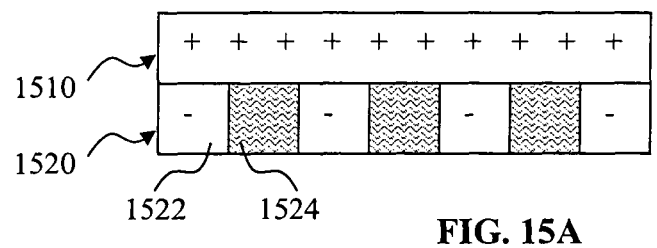
FIG. 15A illustrates a top down view of a portion of a pair of servo tracks according to a first alternate embodiment.

FIG. 15A illustrates a top down view of a portion of a pair of servo tracks according to a first alternate embodiment. A first servo track 1510 is provided, the first servo track 1510 can include a first bit pattern including a unidirectional positive polarization according to an embodiment. A second servo track 1520 is provided, the second servo track 1520 including a second bit pattern including a hybridized unidirectional negative polarization. In the second bit pattern, bit randomization regions 1524 are provided in accordance with a predetermined frequency in the second servo track 1520. The bit randomization portions 1524 are alternated with patterned second servo track portions 1522 including a unidirectional negative polarization.

The nomenclature for such a servo scheme can be referred to as a DC servo+F1 servo scheme or DC+DC*F1 scheme. In such a scheme, one track is a DC track while the other track is a DC track in the opposite polarity with the insertion of AC erase regions. In another embodiment, the first servo track can include a first bit pattern including a hybridized unidirectional positive polarization, while the second track can include a second bit pattern including a unidirectional negative polarization.

Figure 15B:
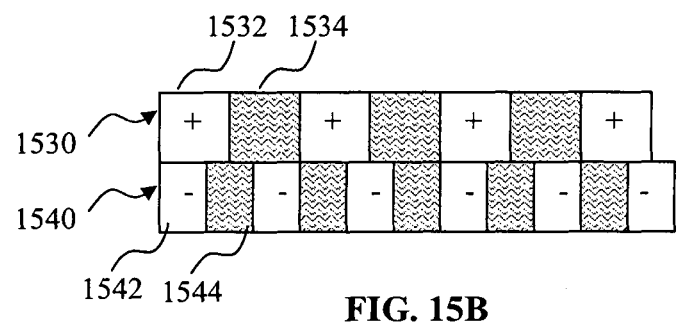
FIG. 15B illustrates a top down view of a portion of a pair of servo tracks according to a second alternate embodiment.

FIG. 15B illustrates a top down view of a portion of a pair of servo tracks according to a second alternate embodiment. A first servo track 1530 is provided, the first servo track 1530 can include a first bit pattern including a hybridized unidirectional positive polarization according to an embodiment. In the first bit pattern, randomization regions 1534 are provided in accordance with a predetermined first frequency in the first servo track 1530. The bit randomization portions 1534 are alternated with patterned first servo track portions 1532 including a unidirectional positive polarization.

A second servo track 1540 is provided, the second servo track 1540 including a second bit pattern including a hybridized unidirectional negative polarization. In the second bit pattern, bit randomization portions 1544 are provided in accordance with a predetermined second frequency in the second servo track 1540. The bit randomization portions 1544 are alternated with patterned second servo track portions 1542 including a unidirectional negative polarization. It can be noted that in this embodiment, the first frequency is different from the second frequency, i.e. there are a different number of bit randomization portions in both tracks. Further, it can be noted that the first frequency is less than the second frequency, i.e. there are less bit randomization portions in the first track 1530 than in the second track 1540.

The nomenclature for such a servo scheme can be referred to as a DC servo hybrid with F1 and F2 servo scheme or DC*F1F2 scheme. In such a scheme, AC erase regions are inserted into DC+ and DC− in a different periodical manner respectively to create a dual frequency servo in DC servo structure. In another embodiment, the first frequency can be higher than the second frequency.

Figure 15C:
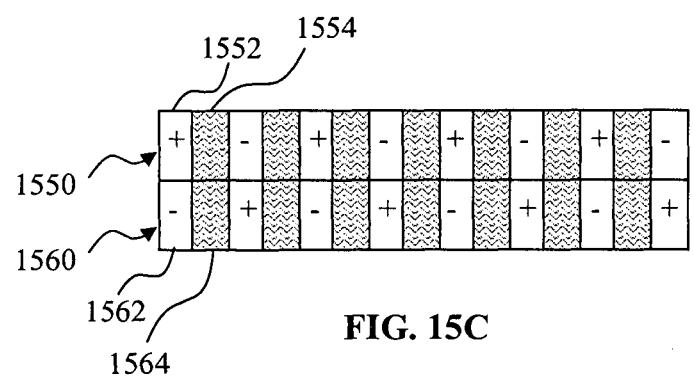
FIG. 15C illustrates a top down view of a portion of a pair of servo tracks according to a third alternate embodiment.

FIG. 15C illustrates a top down view of a portion of a pair of servo tracks according to a third alternate embodiment. A first servo track 1550 is provided, the first servo track 1550 can include a first bit pattern including a hybridized alternating unidirectional positive-negative polarization according to an embodiment. In the first bit pattern, the positive and negatively polarized first servo track portions 1552 are alternated according to a predetermined polarization frequency. In the first bit pattern, randomization regions 1554 are provided in accordance with a predetermined AC erase frequency in the first servo track 1550. The bit randomization portions 1554 are alternated with patterned first servo track portions 1552.

A second servo track 1560 is provided, the second servo track 1560 including a second bit pattern including a hybridized alternating unidirectional negative-positive polarization. In the second bit pattern, the negatively and positively polarized first servo track portions 1562 are alternated according to a predetermined polarization frequency. The polarization frequency in the first track 1550 and the polarization frequency in the second track 1560 are the same in the embodiment. It is noted, in the embodiment, that the patterned first servo track portions are oppositely polarized from the patterned second servo track portion. In the second bit pattern, bit randomization regions 1564 are provided in accordance with a predetermined AC erase frequency in the second servo track 1560. The AC erase frequency in the first track 1550 and the AC erase frequency in the second track 1560 are the same in the embodiment. The bit randomization portions 1564 are alternated with patterned second servo track portions 1562.

The nomenclature for such a servo scheme can be referred to as a Differential F1 with AC erase insertion scheme or Diff F1+AC scheme. In such a scheme, AC erase regions are inserted alternating DC+ and DC− regions of a single frequency, i.e. a (180°) out of phase differential servo. In other embodiments, a frequency-based differential servo scheme is used, where a first track can include a pattern based on a predetermined frequency, and a second track can include a pattern based on a the same predetermined frequency, but shifted out of phase by 180°.

Figure 15D:
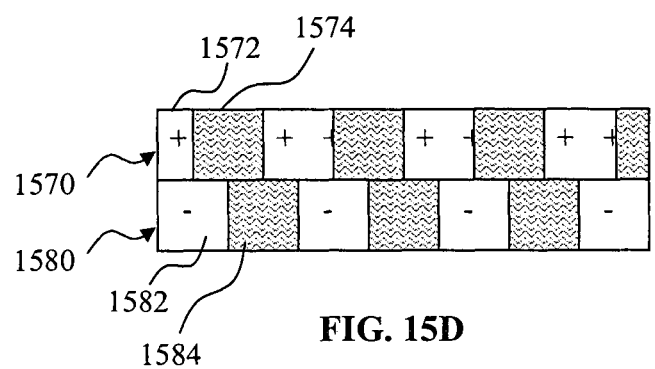
FIG. 15D illustrates a top down view of a portion of a pair of servo tracks according to a fourth alternate embodiment.

FIG. 15D illustrates a top down view of a portion of a pair of servo tracks according to a fourth alternate embodiment. A first servo track 1570 is provided, the first servo track 1570 can include a first bit pattern including a hybridized unidirectional positive polarization according to an embodiment. In the first bit pattern, randomization regions 1574 are provided in accordance with a predetermined first frequency in the first servo track 1570. The bit randomization portions 1574 are alternated with patterned first servo track portions 1572 including a unidirectional positive polarization.

A second servo track 1580 is provided, the second servo track 1580 including a second bit pattern including a hybridized unidirectional negative polarization. In the second bit pattern, bit randomization portions 1584 are provided in accordance with a predetermined second frequency in the second servo track 1580. The first frequency and the second frequency are the same in the embodiment. In the embodiment, however, the bit randomization portions 1574 in the first track are phase or time shifted with respect to the bit randomization portions 1584 in the second track.

In an embodiment, AC erase regions are inserted into DC+ and DC− in a fixed offset periodical manner, which resembles a conjugate frequency servo scheme, in which a pair of servo tracks operate on a same frequency, with one track offsetting the other.

Typically, in frequency based servo system, positioning error signal (PES) may generated by finding the difference in signal amplitude between f1 and f2, where a servo burst pattern may be of a first frequency (f1) and a subsequent servo burst pattern may be of a second frequency (f2). Further, the present disclosure also describes an amplitude scheme in which a resistance of a magnetoresistive head is monitored to determine a PES and thus a lateral deviation of the head. Either one of these schemes may be used according to ease of obtaining results in measuring or determining a PES of a operating read/write head as according to various embodiments.

The previously described embodiments including an AC erase region in an annulus formed by an exterior perimeter of the first annular servo track and an interior perimeter of the second annular servo track have been physically propagated and tested by the applicants of the present application, and the results obtained have shown an advantageous servo scheme as according to the present disclosure. The following experimental data show how embodiments of the present disclosure have contributed to addressing linear and non-linear distortions induced by servo signals from the buried layer.

Figure 16:
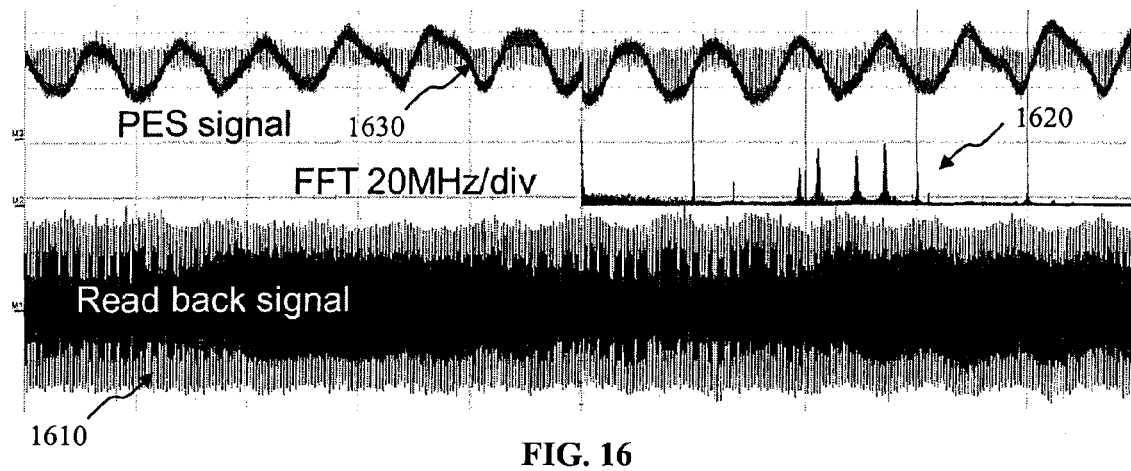
FIG. 16 shows position signals based on a DC servo hybrid with F1 servo according to an embodiment.

FIG. 16 shows position signals based on a DC servo hybrid with F1 servo according to an embodiment. In the embodiment, the DC servo hybrid operates at a frequency of 20 MHz (DC*20 MHz). Read back signals 1610 are extracted and plot according to the embodiment. The read back signals are used in typical frequency-based servo systems to obtain a PES and will not be elaborated on in this disclosure. Further, a fast fourier transform (FFT) is carried out on the read back signal waveforms 1610 to obtain a FFT plot 1620. The frequency component is clearly seen from the FFT plot 1620. Further, a PES signal 1630 extracted from the DC components with a system as earlier described and illustrated in in FIG. 3 is shown as well. The above plots and signals highlight the feasibility of hybrid servo implementations according to the present disclosure.

BER is used to examine the quality of data signal in the presence of servo tracks. Different servo tracks with 100 nm track pitch are written on the dual layer media, i.e. data recording layer and servo layer, and a BER scan is carried out along the cross track direction from an individual servo track center to the next servo track center. Tests on embodiments of the present disclosure are carried out and the results compared with the BER scans of corresponding prior art servo schemes. The results are shown in FIGS. 17 to FIG. 20.

Figure 17:
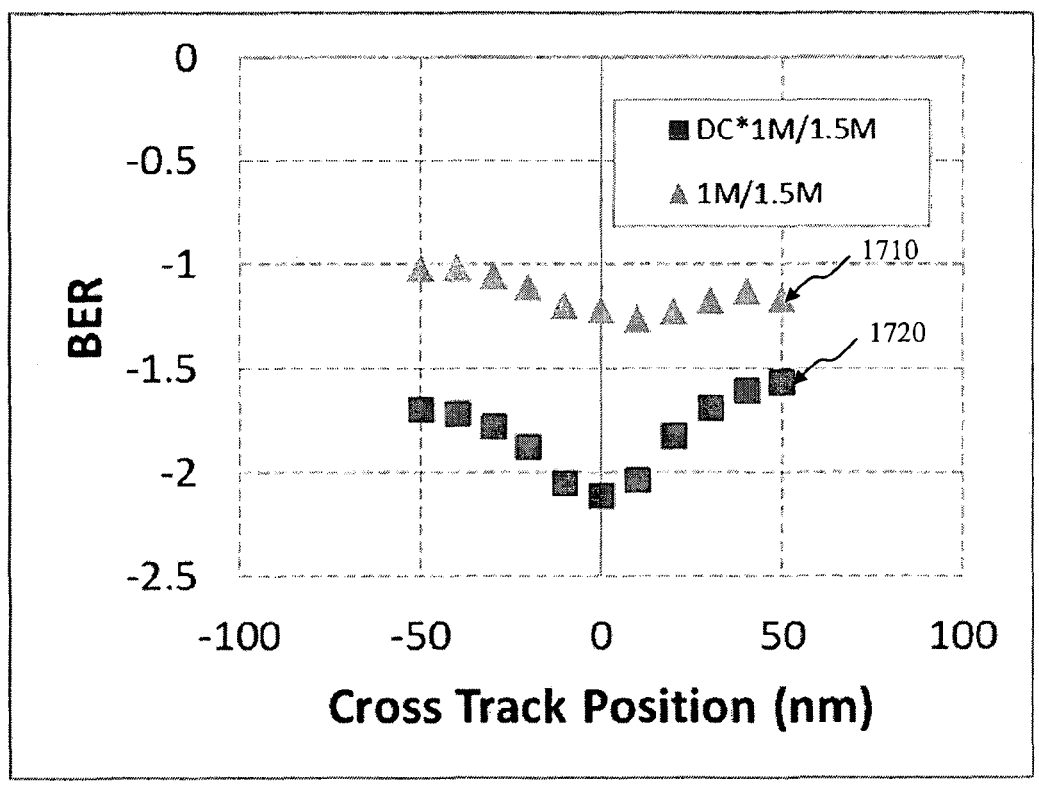
FIG. 17 compares the BER of a dual frequency servo scheme to a hybrid DC*F1F2 scheme.

FIG. 17 compares the BER of a dual frequency servo scheme to a hybrid DC*F1F2 scheme. In the experimentation, the servo frequencies for the dual frequency servo scheme are set at 1 MHz and 1.5 MHz, and in the hybrid servo the frequencies are provided similarly. In such a case, a given name for the hybrid servo scheme can be DC*1M/1.5M. This indicates that a bit randomization portion is provided at 1 MHz for a first servo track and at 1.5 MHz for a second servo track. The BER for the dual frequency servo scheme is provided at 1710 and the BER for the DC*1M/1.5M is provided as 1720. It can be observed that he hybrid servo DC*1M/1.5M 1720 has better BER across all cross track locations. This can show that the insertion of the AC erase region greatly reduces the transition induced linear and non-linear distortions.

Figure 18:
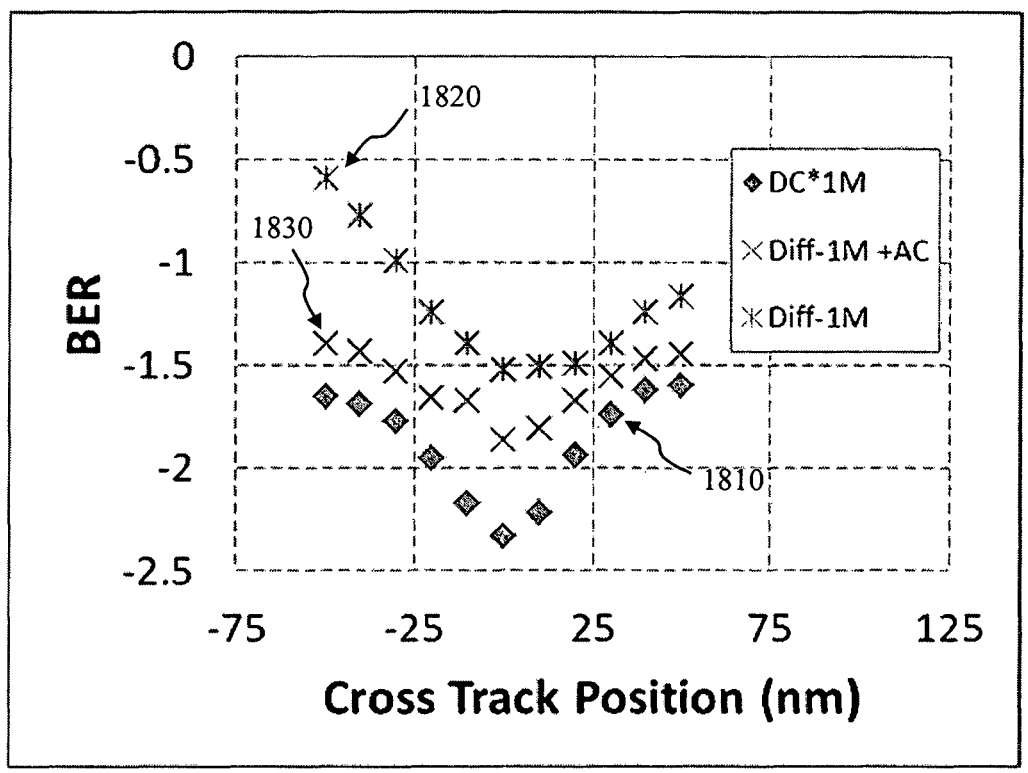
FIG. 18 compares the BER of a single frequency differential servo (Diff-F1) to two hybrid servo patterns: DC*F1 and Diff F1+AC.

FIG. 18 compares the BER of a single frequency differential servo (Diff−F1) to two hybrid servo patterns: DC*F1 and Diff F1+AC. In the experimentation, the servo frequencies are set at 1 MHz, and the 3 different cases have been renamed as (Diff 1M) 1810, (DC*1M) 1820 and (Diff 1M+AC) 1830. Again, both hybrid servo patterns (DC*1M) 1820 and (Diff 1M+AC) 1830 have a better BER than the frequency based scheme (Diff 1M) 1810. Due to a polarity change in the (Diff 1M+AC) scheme along the down track, the effectiveness to reduce the linear and non-linear distortions could be compromised.

Figure 19:
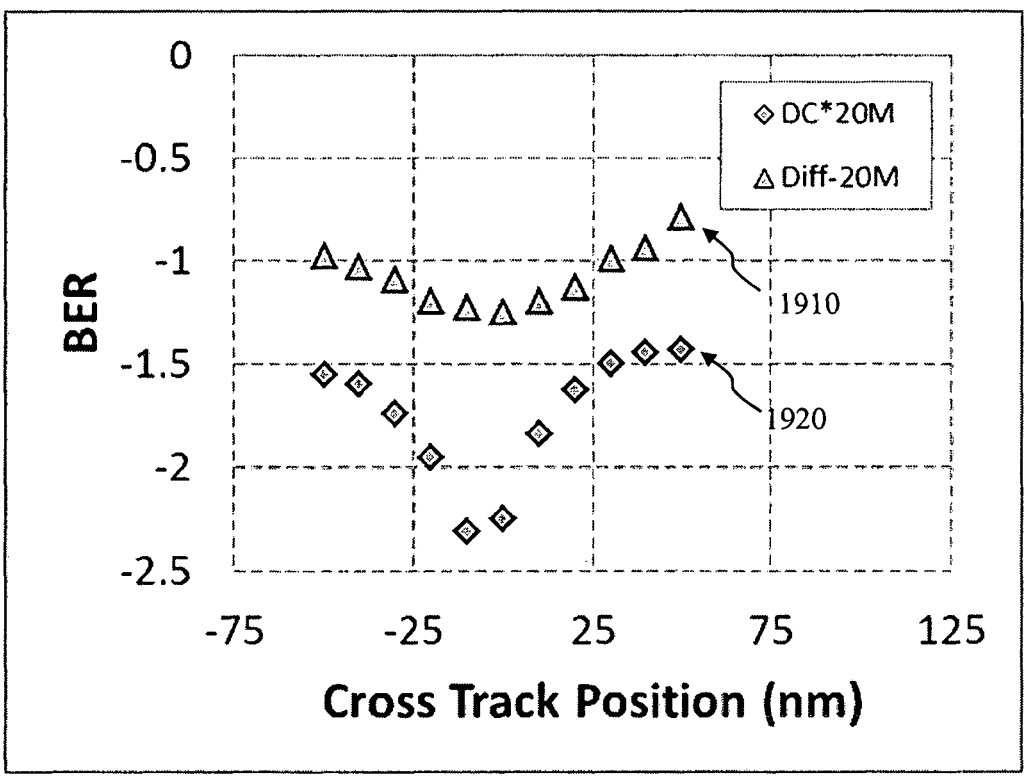
FIG. 19 compares the BER of a frequency based differential servo to a hybrid servo DC*F1.

FIG. 19 compares the BER of a frequency based differential servo to a hybrid servo DC*F1. In this embodiment, the hybrid servo DC*F1 has a higher servo frequency of 20 MHz (DC*20M). The BER for the frequency based differential servo scheme is provided at 1910 and the BER for the DC*20M is provided as 1920. BER has only a slight degradation as compared to the (Diff 20M). Once again, the hybrid servo with single frequency shows its capability to reduce distortions on the data layer.

Figure 20:
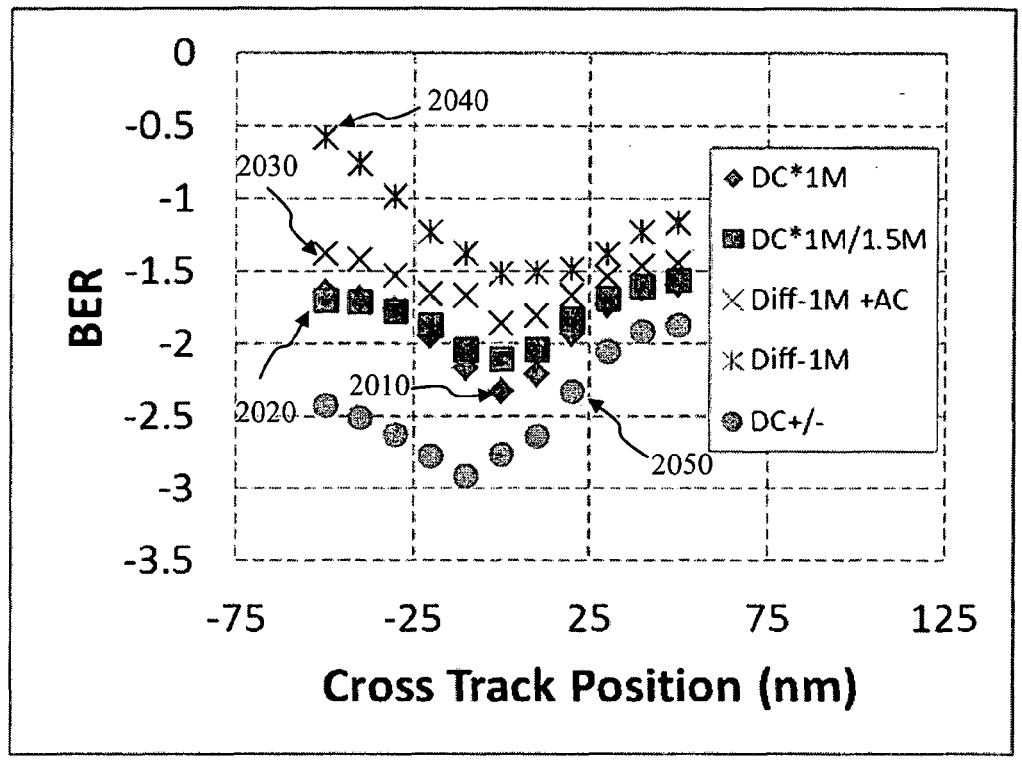
FIG. 20 shows the BER performance of various servo schemes.

FIG. 20 shows the BER performance of various servo schemes. The BER for DC*1M is provided at 2010, for DC*1M/1.5M at 2020, Diff−1M+AC at 2030, frequency based Diff−1M at 2040 and DC+/− at 2050. It can be observed that DC+/− servo 2050 yields the best BER and the new proposed hybrid servo schemes have greatly reduced the gap of distortion introduced as in the frequency-based servo schemes.

Figure 21:
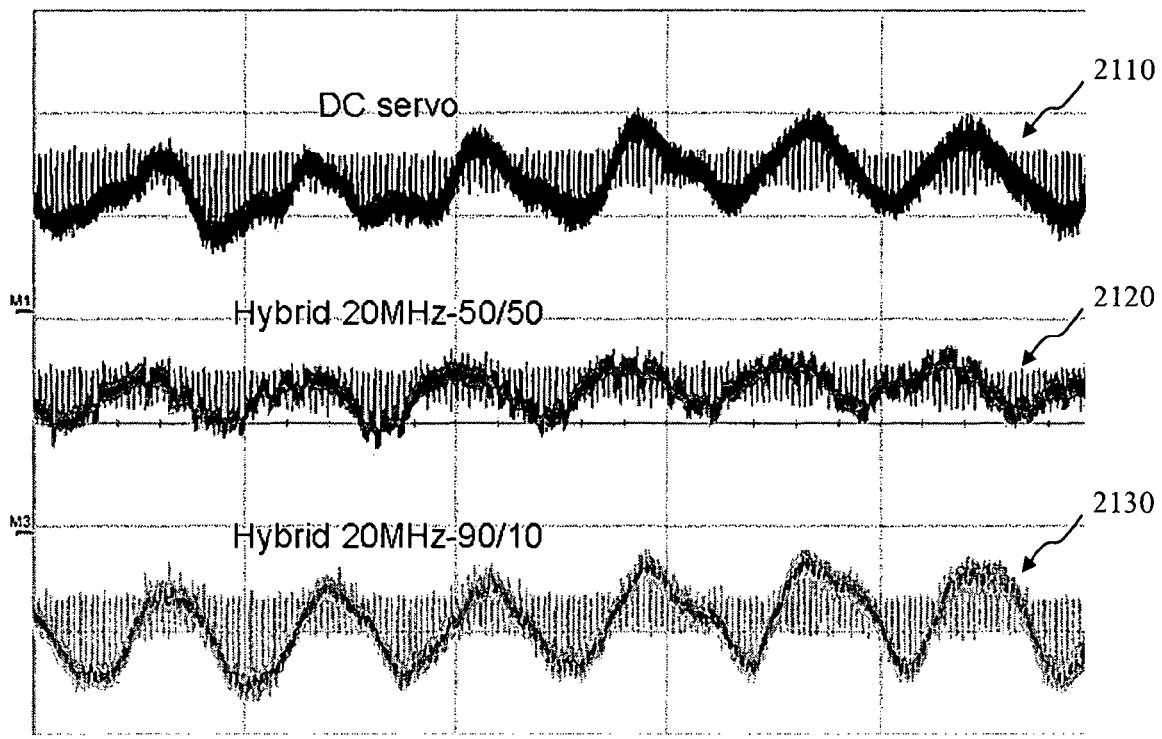
FIG. 21 shows a comparative PES determination signal measurement.

The hybrid servo detection scheme can either utilize a conventional frequency method to measure the amplitude component of the two servo tracks or use a direct measurement of the total amplitude of DC tracks in obtaining PES. FIG. 21 shows a comparative PES determination signal measurement. The PES for DC+/− servo, or simply DC servo is provided at 2110 and obtained with a direct measurement. The PES obtained from the hybrid DC*20 MHz with 50% AC erase insertion 2120 suffers from significant DC amplitude drop. This problem can be overcome by reducing the AC erase region to 10% of DC signal region, as shown in 2130. In this way, the signal amplitude is larger than that from the DC servo. One possible reason could be that the insertion of the AC erase area in the DC signal helps to reduce the self-demagnetisation field and hence the media is more saturated and stable.

Figure 22A:
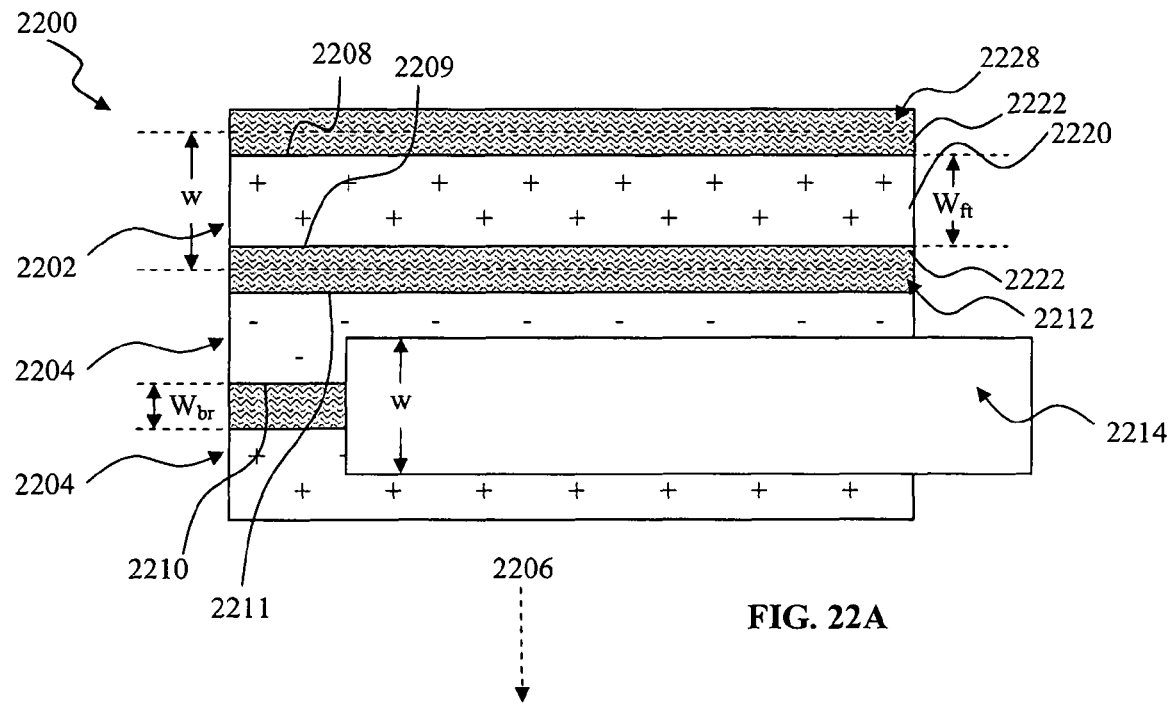
FIG. 22A illustrates a top down view of a portion of a servo layer according to an embodiment.

FIG. 22A illustrates a top down view of a portion of a servo layer 2200 according to an embodiment. A first servo track 2202, or a first annular servo track, is shown provided on, or as part of the servo layer 2200 of the recording medium. Also illustrated is a portion of a second servo track 2204, or a second annular servo track, provided on, or as part of the servo layer 2200 of the recording medium, and adjacent to the first servo track 2202. In providing that the second servo track 2204 is provided adjacent to the first servo track 2202, it is indicated that the first servo track 2202 can be next to the second servo track 2204, but it can also be that the first servo track 2202 is provided close to the second servo track 2204. In an embodiment, the first servo track 2202 is adjacent to the second servo track 2204 through an intermediate portion.

Downward pointing arrow 2206 provides a reference to the center of the recording medium. In such a case, the first annular servo track 2202, further a first patterned servo track portion 2220, includes an exterior perimeter 2208 and an interior perimeter 2209, and the second annular servo track 2204, further a second patterned servo track portion 2226, includes an interior perimeter 2210 and an exterior perimeter 2211. A bit randomization portion 2212 is provided in an annulus formed by the exterior perimeter 2208 of the first annular servo track 2202 and an interior perimeter 2210 of the second annular servo track 2204.

Figure 22B:
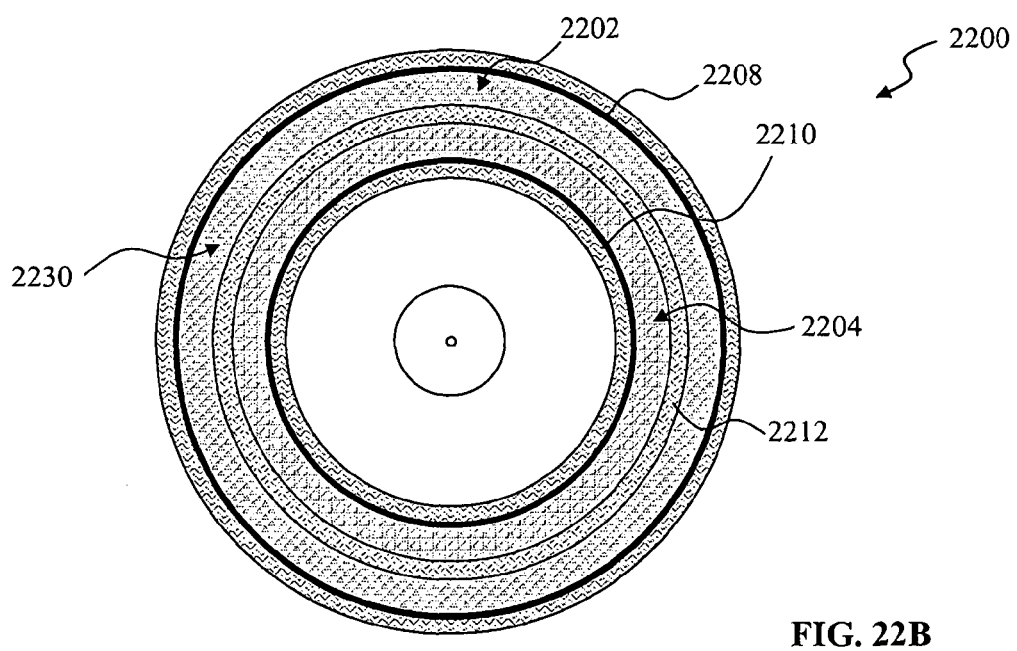
FIG. 22B illustrates a top down schematic representation of the servo layer of FIG. 22A.

FIG. 22B illustrates a top down schematic representation of the servo layer 2200 of FIG. 22A. An annulus 2230 is shown, formed by the exterior perimeter 2208 of the first annular servo track 2202 and an interior perimeter 2210 of the second annular servo track 2204. The circumferential sides of the annulus 2230 are highlighted for reference. It is noted that a bit randomization portion 2212 is provided in annulus 2230 according to various embodiments.

According to an embodiment, a first servo track 2202 includes a first bit pattern. Further, a second servo track 2204 includes a second bit pattern. In an embodiment, the first servo track 2202 includes a first bit pattern including a unidirectional positive polarization and the second servo track 2204 includes a second bit pattern including a unidirectional negative polarization. Further, first servo track 2202 and/or second servo track 2204 can include a bit randomization portion. However, it is noted that in references to various embodiments in the disclosure, a servo track can relate to the patterned servo track portion which includes a magnetic directional polarization. In such a case, a servo track can be referred to as being provided next to a bit randomization portion. Further, a bit randomization portion can be provided in between two servo tracks.

According to an embodiment, a bit randomization portion 2212 is provided in between the first patterned servo track portion 2220 and the second patterned servo track portion 2226. According to an embodiment, a bit randomization portion 2212, in which a net resultant magnetic directional polarization is substantially zero and of an indiscernible direction, is provided in between a first patterned servo track portion 2220 including a unidirectional positive polarization and a second patterned servo track portion 2226 including a unidirectional negative polarization. In other words, a portion of the servo layer 2200 includes the first patterned servo track portion 2220 including a net resultant magnetic field of a first direction, the bit randomization portion 2212 including net resultant magnetic field with no discernible strength and direction, and the second patterned servo track portion 2226 including a net resultant magnetic field of a second direction, the second direction opposite to the first direction.

As mentioned above, a data recording track typically includes a predetermined track width w or track pitch. Such a track width w is consistent amongst each data recording track in the plurality of concentric annular data recording tracks. Similarly, servo tracks, further, servo tracks in a buried layer servo system, are written with a similar track width w as with the data recording tracks. As mentioned above, a data track is arranged directly in between a first servo track and a second servo track, according to an embodiment of the present disclosure.

According to an embodiment, a bit randomization portion 2212 is provided in between a first patterned servo track portion 2220 and a second patterned servo track portion 2226 on a servo layer 2200. The servo layer 2200 is provided below a data recording layer in a recording medium. As indicated, data recording tracks provided on the data recording layer are of a predetermined consistent track width w. In the servo scheme of the embodiment, a data track is still intended to be arranged over and directly in between two servo tracks. In an embodiment, data track 2214 is arranged over and directly in between second servo track 2204 and third servo track 2216. Data track 2214 is of track width w.

In consideration of providing a consistency between a servo track width and a data recording track width, in the present embodiment, in preparing or forming a servo track, a patterned servo track portion, in which includes a bit pattern for a servo track, is reduced in width, in a servo track. This is to allow for a bit randomization portion to be provided, alongside the patterned servo track portion, in a servo track. In previous embodiments, a servo track has a typical width w, and a bit pattern creates a magnetic directional polarization in at least across a width w; in other words, the patterned servo track is the first servo track.

According to various embodiments, a first servo track 2202 can be defined as including a track width w. First servo track 2202 can include a first patterned servo track portion 2220 and a bit randomization portion. Further, first servo track 2202 can include a first patterned servo track portion 2220 and a bit randomization portion 2222 provided adjacent to the exterior perimeter of the first patterned servo track portion 2220 and a bit randomization portion 2224 provided adjacent to the interior perimeter of the first patterned servo track portion 2220. As such, first servo track 2202 includes a bit randomization portion.

In an embodiment, a first patterned servo track portion 2220 is provided with a width $w_{fp}$, where the first patterned servo track portion 2220 substantially encompasses the area in the first servo track 2202 which includes a magnetic directional polarization. It can be noted that the first patterned servo track portion 2220 has been reduced in width to accommodate the inclusion of a bit randomization portion according to the present disclosure.

According to an embodiment, a bit randomization portion 2222 is provided in a first servo track 2202 on a servo layer 2200. Bit randomization portion 2222 is provided adjacent to or next to a first patterned servo track portion 2220, and in an embodiment, adjacent to an exterior perimeter 2208 of the first servo track portion. Bit, randomization portion 2224 is also provided adjacent to or next to the first patterned servo track portion 2220, an in various embodiments, adjacent to an interior perimeter 2210 of the patterned first servo track portion 2220.

In forming or preparing servo layer 2200 in the recording medium, a writing head of a servo track writer is used to prepare or write a first servo track 2202 according to an embodiment of the present disclosure. Additionally, the writing head is used to write a bit randomization portion 2222, a first patterned servo track portion 2220 including a unidirectional positive polarization, and a bit randomization portion 2224 in writing the first servo track 2202.

According to an embodiment, a high frequency signal is provided to a writing head to write a bit randomization portion, and a positive DC is used to write the first patterned servo track portion 2220. The writing head includes an inductive element forming a magnetic field upon an electrical current stimulation. As such, it is not possible to write both an AC erase portion as well as a DC+ portion according to an embodiment. The writing head instead writes concentric annular portions on the recording medium from the circumference in towards the center of the disk.

In an embodiment, a control module in the servo track writer controls a flexure arm carrying a writing head and supplies a low voltage high frequency signal to the writing head to write a bit randomization portion 2228 with a width $w_{br}$. The writing is carried out for at least one revolution of the recording medium rotating about a central rotational axis. Thereafter, the control module laterally translates the flexure arm towards the center of the recording medium, the writing head is translated by a distance of $w_{br}$. The writing head can have a dimension providing a capability to write a track of at least width w. In an embodiment, the writing head writes all concentric annular portions on the recording medium with a width w and thereafter overwrites any written portions where necessary in a translation of the writing head of a distance less than w. In another embodiment, the control module is able to provide careful control to the writing head such that only a desired width of a track is written or magnetized.

In an embodiment, after the writing head completes writing bit randomization portion 2228 and shifts by a distance of $w_{br}$, the control module provides a DC to the writing head and writes the first patterned servo track portion 2220, for at least one revolution of the recording medium. Thereafter, the flexure arm is translated by a distance $w_{ft}$, which is the predetermined width of the first patterned servo track portion 2220. A high frequency signal is then used by the writing head to write a bit randomization portion 2212. In doing so, a first servo track 2202 is written, the first servo track 2202 including a track width w.

According to an embodiment, an AC erase region is added in between two servo tracks in the buried layer dedicated servo scheme. If the data is written on top of AC erasure region, the interference from servo signal to data signal is reduced. AC erase insertion maintains a sensitivity function of a two track servo and does not affect the scalability to use larger servo tracks to accommodate narrower data track pitch (scaling servo). Further, adjusting the AC erasure track width enables controlling an effective amplitude ratio of data to servo layer signal, K value. Increasing the K value will reduce the servo to data interference. This is especially useful in scaling servo.

FIG. 23 illustrates a BER measurement according to an embodiment. The raw BER improvement over the AC erasure region can be seen in 2300. The experimentation results use a DC+/DC− servo scheme according to an embodiment. The "AC" case 2310 represents an ideal case wherein no servo is written and hence, no interference from the servo layer to the data layer. "EB-0 nm" in means there is no additional insertion of AC erase track in between the first and the second servo tracks, while subsequent "EB-5 nm", "EB-10 nm" and "EB-20 nm" indicate an AC erase track with of 5 nm, 10 nm and 15 nm are being inserted accordingly. It can be observer that the increment of the AC erase track in width in between the first and second patterned servo portions will eventually reduce the interference to the data layer.

FIG. 24A illustrates a reader sensitivity function for a data track read process, and FIG. 24B illustrates a reader sensitivity function for a servo track read process. One of the concerns in adding the AC erasure track sandwich between a first servo track and a second servo track is the impact on the PES sensitivity and scalability property of dedicated servo. A simulation using reader sensitivity function to read the cross track profile of DC+/DC− servo is carried out verification. In the simulation, the reader dimension is set at 40 nm cross track and 3 nm down track with shield thickness respectively 2 um and 1 um respectively and 10 nm gap length. The corresponding reader sensitivity function of 38 nm spacing (reader and the media) is used to capture track amplitude along the cross track of servo track pitch.

Figure 25:
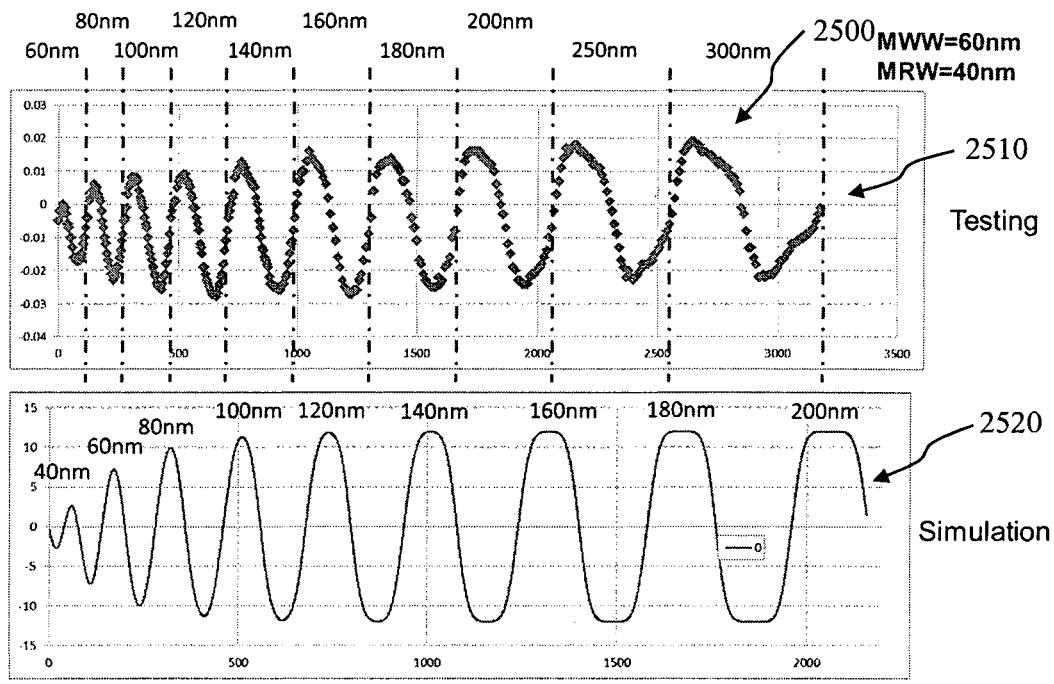
FIG. 25 shows the PES sensitivity function for a range of different track pitch signals.

FIG. 25 shows the PES sensitivity function for a range of different track pitch signals. The plot 2500 covers a track pitch range from 40 nm up to 300 nm without AC erase track in between. Both experiment testing 2510 and simulation results 2520 are agreed well. Simulation results show that for 40 nm reader width, the PES sensitivity function is good up to 120 nm track pitch before it start saturated. It shows that because of the large spacing gap between the reader and servo layer, the scalability of the servo in purely 2 tracks scheme can tolerate up to 3 times the data track pitch.

Figure 26:
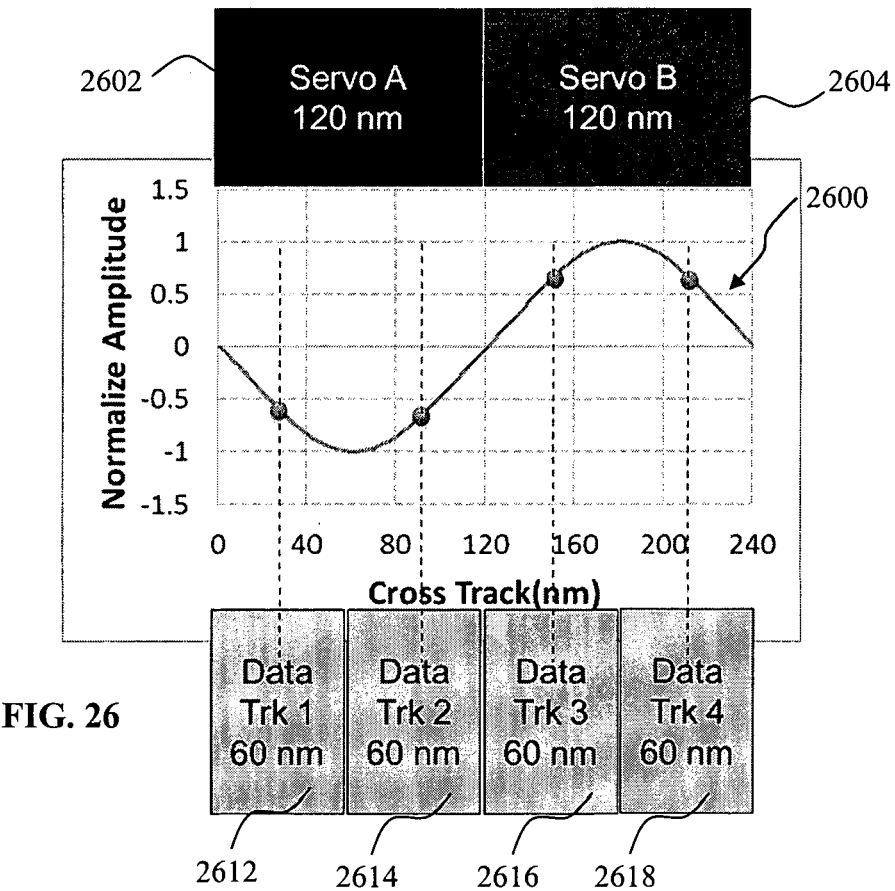
FIG. 26 shows an amplitude according to a cross track variation.

FIG. 26 shows an amplitude according to a cross track variation. In an embodiment, a servo scheme is provided using 120 nm servo track pitch to accommodate 60 nm data track pitch. Such an embodiment describes an example of servo scaling, where the servo track pitch in larger than the data track pitch. In an embodiment, a first servo track 2602 and a second servo track 2604 are provided on a servo layer on a recording medium. The first servo track 2602 and the second servo track 2604 are provided with a servo track pitch of 120 nm. Further, four data tracks 2612, 2614, 2616 and 2618 are provided on a data recording layer of the recording medium, each of track width 60 nm. It is noted that the total width of the first servo track 2602 and the second servo track 2604 is equal to the total width of the four data tracks 2612, 2614, 2616 and 2618. In other words, the two servo tracks 2602 and 2604 corresponds to the four data tracks 2612, 2614, 2616 and 2618, when the tracks are projected on a plane parallel to the servo layer.

Plot 2600 indicates how an amplitude of PES can vary with respect to cross track variation. It can be observed that the resultant magnetic field of adjoining positively and negatively polarized servo tracks can correlate to the position of a read/write head in use with respect to the four data tracks 2612, 2614, 2616 and 2618. In other embodiments, the track widths of the servo tracks and the track widths of the data tracks may not be equal, nor of a multiple in relation to each other. Nevertheless, the oppositely polarized servo tracks still provide for a position error reference for an operating read/write head on a data track. In other words, the first and second servo tracks can act as corresponding to any number of data tracks provided directly or perpendicularly above the first and second servo tracks.

Figure 27:
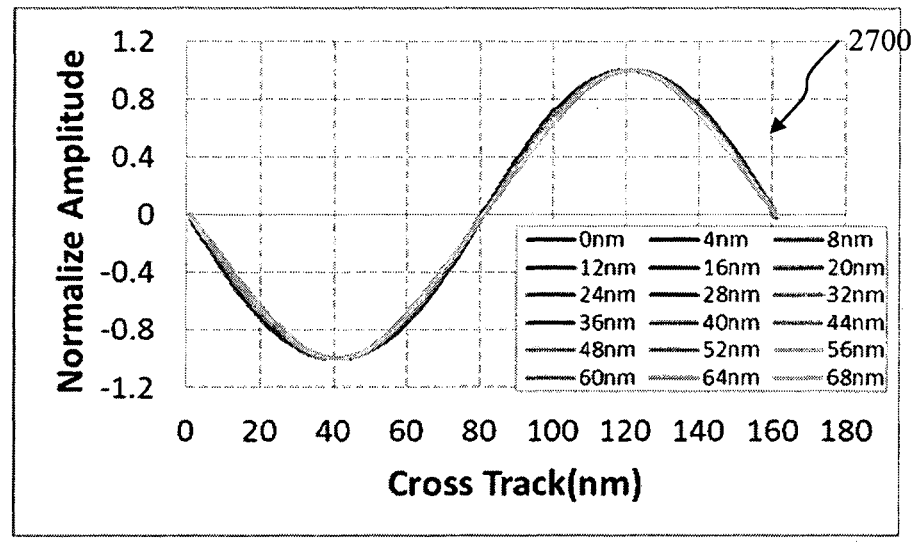
FIG. 27 shows normalized PES cross track variation across various track pitches.
Figure 28:
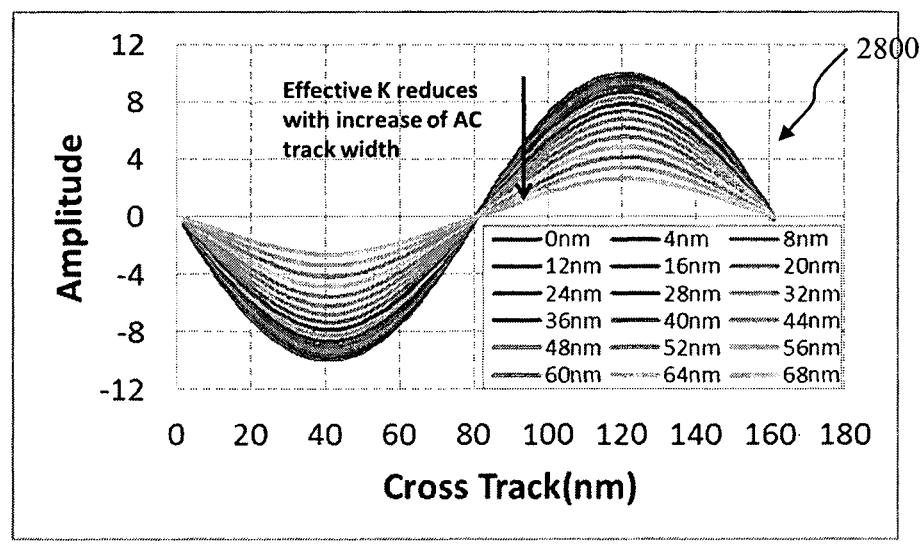
FIG. 28 shows PES cross track variation across various track pitches.

In simulation to study the AC erasure track insertion effect on the PES sensitivity, servo track pitch are set up to 80nm which is 2 times larger than the reader width. The corresponding cross track profile is shown in FIG. 27 and FIG. 28. FIG. 27 shows normalized PES cross track variation 2700 across various track pitches. The result demonstrates that increasing the AC erasure track width has little effect on the PES sensitivity function and furthermore it prolongs the linear region with AC erasure track width increases. FIG. 28 shows PES cross track variation across various track pitches. FIG. 8 shows that the track amplitude reduces when the AC erasure track width is increased. This shows that by simply adjust the AC erasure track width, the effective K value can be increased and subsequently, the interference to the data layer signal will be reduced.

Figure 29:
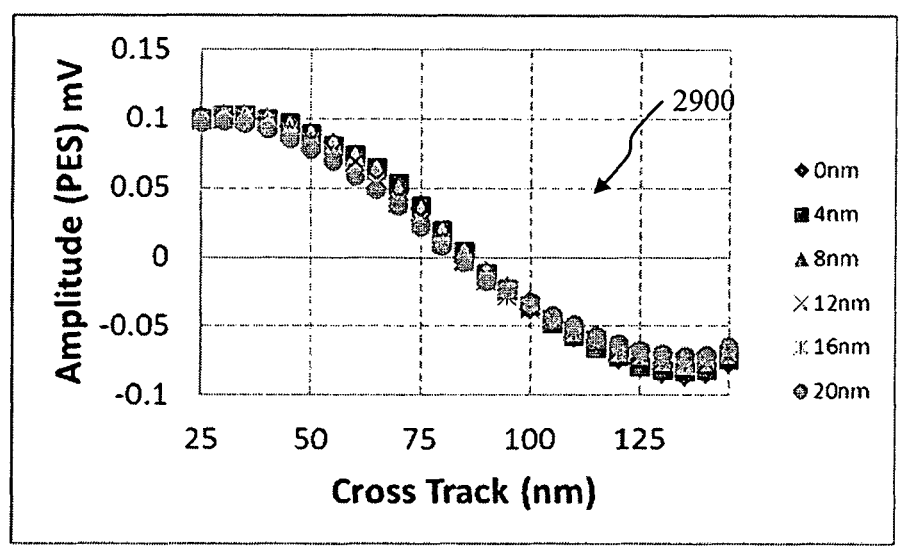
FIG. 29 shows results of a cross track profile of a reader.

FIG. 29 shows results of a cross track profile of a reader. In 2900, the reader width is provided at 53nm, and the track pitch is set at 80nm. It confirms the AC erasure track width has little impact on the PES sensitivity function as shown in simulation results. The experimental data in FIG. 29 confirms the simulation result in FIG. 27 and FIG. 28.

Figure 30:
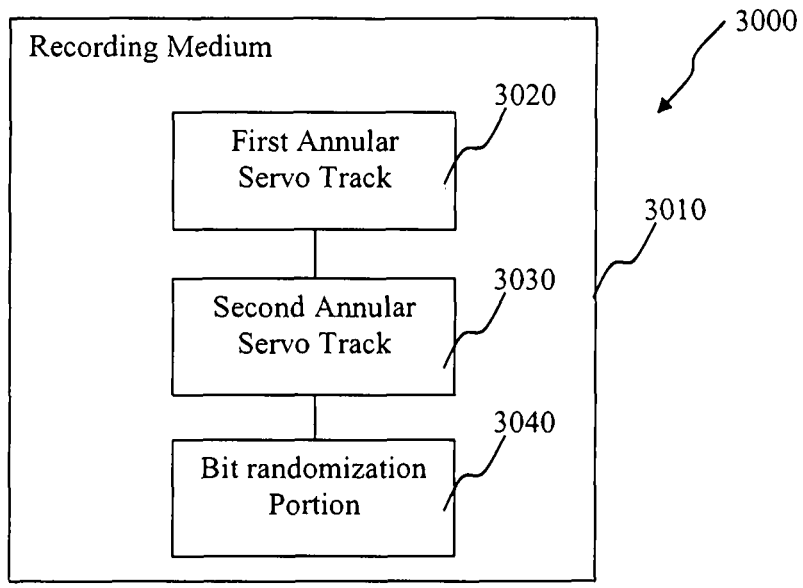
FIG. 30 illustrates a schematic of a recording medium according to an aspect of the present disclosure.

FIG. 30 illustrates a schematic of a recording medium 3000 according to an aspect of the present disclosure. Recording medium 3000 can include a first annular servo track 3010 provided on a first layer of the recording medium. Recording medium 3000 can also include a second annular servo track 3020 provided on the first layer of the recording medium and adjacent to the first annular servo track 3010. In the recording medium 3000, a bit randomization portion 3040 is provided in an annulus formed by an exterior perimeter of the first annular servo track 3010 and an interior perimeter of the second annular servo track 3020.

In an embodiment, the first annular servo track is provided with a first bit pattern, and the second annular servo track is provided with a second bit pattern.

In an embodiment, the first bit pattern includes magnetic bits directionally polarized to a first direction.

In an embodiment, the first bit pattern includes magnetic bits directionally polarized to a second direction opposite to the first direction.

In an embodiment, the first bit pattern includes a unidirectional positive polarization, and the second bit pattern includes a unidirectional negative polarization.

In an embodiment, the first bit pattern includes magnetic bits directionally polarized according to a first frequency, and the second bit pattern includes magnetic bits directionally polarized according to a second frequency.

In an embodiment, the first frequency is the second frequency.

In an embodiment, the second bit pattern is phase-shifted by 90° from the first bit pattern.

In an embodiment, the second bit pattern is phase-shifted by 180° from the first bit pattern.

In an embodiment, a plurality of bit randomization portions is provided in any one of the first annular servo track and the second annular servo track.

In an embodiment, the plurality of bit randomization portions is provided at regular intervals in any one of the first annular servo track and the second annular servo track.

In an embodiment, any one of the first and second bit pattern includes magnetic bits directionally polarized according to a frequency, and wherein a random polarization of magnetic bits is provided in each cycle of the any one of the first bit pattern and the second bit pattern.

In an embodiment, the random polarization is provided in a fixed phase portion of each cycle of the any one of the first bit pattern and the second bit pattern.

In an embodiment, the first bit pattern includes magnetic bits directionally polarized according to a first frequency, and the second bit pattern includes magnetic bits directionally polarized according to a second frequency, and wherein a random polarization of magnetic bits is provided in each cycle of the first bit pattern and the second bit pattern.

In an embodiment, the bit randomization portion is provided between the first annular servo track and the second annular servo track.

In an embodiment, the bit randomization portion is provided between a first patterned servo portion in the first annular servo track and a second patterned servo portion in the second annular servo track.

In an embodiment, the first annular servo track includes a first bit pattern including a unidirectional positive polarization and the second annular servo track includes a second bit pattern including a unidirectional negative polarization.

In an embodiment, the first annular servo track, the second annular servo track and the bit randomization portion are constant in width about the recording medium.

In an embodiment, the recording medium further includes a third annular track configured to store data, the third annular track provided on a second layer of the recording medium.

In an embodiment, the second layer of the recording medium is provided proximal to a top surface of the recording medium.

In an embodiment, the second layer of the recording medium is provided between the top surface of the recording medium and the first layer.

In an embodiment, the third annular track is provided equidistant between the first annular servo track and the second annular servo track when the first annular servo track, the second annular servo track and the data track are projected onto a plane parallel a servo layer.

In an embodiment, the first annular servo track, the second annular servo track and third annular track are equal in width, and the third annular track is provided half a track width from the first annular servo track and the second annular servo track.

Figure 31:
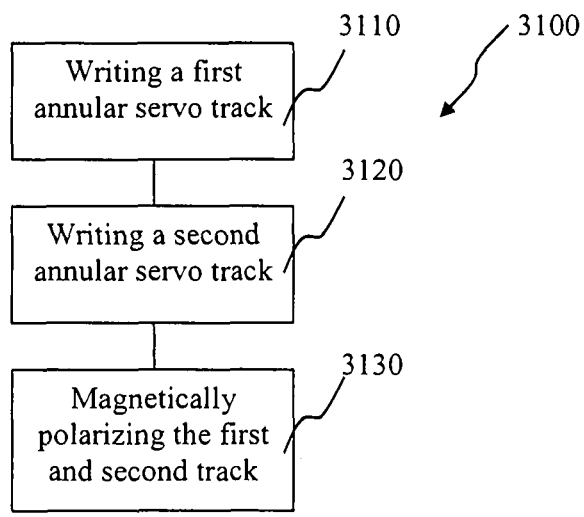
FIG. 31 illustrates a block diagram of a method according to an aspect of the present disclosure.

FIG. 31 illustrates a block diagram of a method 3100 according to an aspect of the present disclosure. Method 3100 can be a method of preparing a recording medium including. In 3110, the method can include writing a first annular servo track on a first layer of the recording medium. In 3120, the method can include writing a second annular servo track on the first layer of the recording medium, where the second annular servo track is adjacent to the first annular servo track. In 3130, carrying out the method can include where a bit randomization portion is provided within an angular sector of an annulus formed by the first annular servo track and the second annular servo track.

In an embodiment, the method further includes writing a first bit pattern onto the first annular servo track including directionally polarizing magnetic bits in the first annular servo track; and writing a second bit pattern onto the second annular servo track including directionally polarizing magnetic bits in the second annular servo track.

In, an embodiment, writing a first bit pattern includes directionally polarizing magnetic bits in a first direction, and writing a second bit pattern includes directionally polarizing magnetic bits in a second direction opposite to the first direction.

In an embodiment, the method further includes polarizing magnetic bits in a unidirectional positive polarization in the first bit pattern, and polarizing magnetic bits in a unidirectional negative polarization in the second bit pattern.

In an embodiment, writing a first bit pattern includes directionally polarizing magnetic bits according to a first frequency, and writing a second bit pattern includes directionally polarizing magnetic bits according to a second frequency in the second bit pattern.

In an embodiment, the first frequency is the second frequency.

In an embodiment, the second bit pattern is phase-shifted by 90° from the first bit pattern.

In an embodiment, the second bit pattern is phase-shifted by 180° from the first bit pattern.

In an embodiment, a plurality of bit randomization portions is provided in any one of the first annular servo track and the second annular servo track.

In an embodiment, the method further includes writing a plurality of bit randomization portions at regular intervals along any one of the first track and second track.

In an embodiment, the method further includes directionally polarizing magnetic bits according to a frequency in any one of the first bit pattern and the second bit pattern, and providing a random polarization of magnetic bits in each cycle of the any one of the first bit pattern and the second bit pattern.

In an embodiment, the method further includes providing the random polarization in a fixed phase portion of each cycle of the any one of the first bit pattern and the second bit pattern.

In an embodiment, the method further includes directionally polarizing magnetic bits according to a first frequency in the first bit pattern and directionally polarizing magnetic bits according to a second frequency in the second bit pattern; and providing a random polarization of magnetic bits in each cycle of the first bit pattern and the second bit pattern.

In an embodiment, the method further includes writing a bit randomization portion between the first track and the second track.

In an embodiment, the method further includes writing a bit randomization portion between a first patterned servo portion in the first annular servo track and a second patterned servo portion in the second annular servo track.

In an embodiment, the method further includes unidirectionally polarizing magnetic bits positively in the first bit pattern and unidirectionally polarizing magnetic bits negatively in the second bit pattern.

In an embodiment, the method further includes writing the first track, the second track and the bit randomization portion with constant widths about the recording medium.

In an embodiment, the method further includes writing the first track includes passing an electrical current through a write element for magnetizing a magnetic bit.

In an embodiment, the method wherein writing the bit randomization portion includes passing a low electrical current through a write element at a high frequency.

In an embodiment, the method further includes wherein writing the bit randomization portion includes passing a low electrical current through a write element at about 350 MHz.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of preparing a recording medium comprising:
   writing a first annular servo track on a first layer of the recording medium, wherein the first annular servo track has a magnetic polarization of a first direction; and
   writing a second annular servo track on the first layer of the recording medium,
   wherein
      the second annular servo track has a magnetic polarization in a second direction opposite the first direction,
      the second track is adjacent to the first track,
      the first annular servo track has a first bit pattern, and
      the second annular servo track has a second bit pattern.

2. The method according to claim 1, wherein:
   writing the first annular servo track comprises polarizing magnetic bits in a unidirectional positive polarization; and
   writing the second annular servo track comprises directionally polarizing magnetic bits in a unidirectional negative polarization.

3. The method according to claim 1, wherein writing the first annular servo track comprises passing an electrical current through a write element for magnetizing a magnetic bit.

4. The method according to claim 3, wherein:
   writing the first annular servo track comprises passing a positive direct current through the write element; and
   writing the second annular servo track comprises passing a negative direct current through the write element.

5. A recording medium comprising:
   a first annular servo track provided on a first layer of the recording medium; and
   a second annular servo track provided on the first layer of the recording medium and adjacent to the first annular servo track,
   wherein
      the first annular servo track is provided with a first bit pattern,
      the second annular servo track is provided with a second bit pattern, and
      a bit randomization portion is provided in an annulus formed by an exterior perimeter of the first annular servo track and an interior perimeter of the second annular servo track.

6. A data storage apparatus comprising:
   the recording medium of claim 5, wherein the recording medium comprises
      a data layer comprising a data track, wherein the data track corresponds to the first annular servo track and the second annular servo track,
      a servo layer comprising the first servo track and the second servo track, wherein the first servo track and the second servo track are magnetically opposite in polarity;
   a sensor head configured to carry out a read function or a write function on the data track;
   a measurement circuit configured to measure a voltage in the sensor head while carrying out the read function or the write function; and
   a position error determination circuit configured to determine a position error signal of the sensor head based on a change in the voltage.

7. The data storage apparatus according to claim 6, wherein the change in voltage across the sensor head relates to a lateral deviation of the sensor head in carrying out the read function or the write function.

8. The data storage apparatus according to claim 6, further comprising a direct current offset circuit configured to address an inherent sensor head resistance in the voltage.

9. The data storage apparatus according to claim 6, further comprising a high pass filter configured to address an inherent sensor head resistance in the voltage.

10. The recording medium according to claim 5, wherein:
    the first bit pattern comprises magnetic bits directionally polarized to a first direction; and
    the second bit pattern comprises magnetic bits directionally polarized to a second direction opposite to the first direction.

11. The recording medium according to claim 5, wherein:
    the first bit pattern comprises a unidirectional positive polarization; and
    the second bit pattern comprises a unidirectional negative polarization.

12. The recording medium according to claim 5, wherein:
the first bit pattern comprises magnetic bits directionally polarized according to a first frequency; and
the second bit pattern comprises magnetic bits directionally polarized according to a second frequency.

13. The recording medium according to claim 12, wherein the first frequency is a same frequency as the second frequency.

14. The recording medium according to claim 13, wherein the second bit pattern is phase-shifted by 180° from the first bit pattern.

15. The recording medium according to claim 5, further comprising a plurality of bit randomization portions at regular intervals in any one of the first annular servo track and the second annular servo track, wherein the plurality of bit randomization portions comprise the bit randomization portion provided in the annulus formed by the exterior perimeter of the first annular servo track and the interior perimeter of the second annular servo track.

16. The recording medium according to claim 5, wherein:
any one of the first and second bit pattern comprises magnetic bits directionally polarized according to a frequency; and
a random polarization of magnetic bits is provided in each cycle of the any one of the first bit pattern and the second bit pattern.

17. The recording medium according to claim 16, wherein the random polarization is provided in a fixed phase portion of each cycle of the any one of the first bit pattern and the second bit pattern.

18. A recording medium comprising:
a first annular servo track provided on a first layer of the recording medium; and
a second annular servo track provided on the first layer of the recording medium and adjacent to the first annular servo track,
wherein
a bit randomization portion is provided in an annulus formed by an exterior perimeter of the first annular servo track and an interior perimeter of the second annular servo track,
the bit randomization portion is provided between the first annular servo track and the second annular servo track, and
the first servo track, the second servo track, and the bit randomization portion are implemented on a same layer of the recording medium.

19. A recording medium comprising:
a first annular servo track provided on a first layer of the recording medium; and
a second annular servo track provided on the first layer of the recording medium and adjacent to the first annular servo track,
wherein
a bit randomization portion is provided in an annulus formed by an exterior perimeter of the first annular servo track and an interior perimeter of the second annular servo track, and
the bit randomization portion is provided between (i) a first patterned servo portion in the first annular servo track and (ii) a second patterned servo portion in the second annular servo track.

* * * * *